US012677088B2

(12) United States Patent
Seok et al.

(10) Patent No.: US 12,677,088 B2
(45) Date of Patent: Jul. 7, 2026

(54) ELECTRONIC DEVICE INCLUDING WIRELESS EARPHONE AND CRADLE, AND METHOD OF OPERATING THE SAME

(71) Applicant: SAMSUNG ELECTRONICS CO., LTD., Suwon-si (KR)

(72) Inventors: Munki Seok, Suwon-si (KR); Daesun Rhee, Suwon-si (KR); Youngseok Bang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 18/107,837

(22) Filed: Feb. 9, 2023

(65) Prior Publication Data

US 2023/0217150 A1 Jul. 6, 2023

Related U.S. Application Data

(63) Continuation of application No. PCT/KR2023/000155, filed on Jan. 4, 2023.

(30) Foreign Application Priority Data

Jan. 6, 2022 (KR) ........................ 10-2022-0002306
May 23, 2022 (KR) ........................ 10-2022-0062704

(51) Int. Cl.
*H04R 1/1025* (2026.01)

(52) U.S. Cl.
CPC ..... *H04R 1/1025* (2013.01); *H04R 2205/021* (2013.01); *H04R 2460/17* (2013.01)

(58) Field of Classification Search
CPC ...... H04R 1/10; H04R 1/1025; H04R 1/1016; H04R 1/1091; H04R 2205/021; H04R 2460/17; H04R 5/033

(Continued)

(56) References Cited

U.S. PATENT DOCUMENTS

2009/0207013 A1 8/2009 Ayed
2015/0078574 A1 3/2015 Shin
(Continued)

FOREIGN PATENT DOCUMENTS

CN 111586519 A * 8/2020 ........... H04R 29/001
CN 111787158 A 10/2020
(Continued)

OTHER PUBLICATIONS

International Search Report (PCT/ISA/210) issued Apr. 12, 2023 from the International Searching Authority in International Application No. PCT/KR2023/000155.
(Continued)

*Primary Examiner* — Ahmad F. Matar
*Assistant Examiner* — Sabrina Diaz
(74) *Attorney, Agent, or Firm* — Sughrue Mion, PLLC

(57) ABSTRACT

An electronic device according to embodiments of the present disclosure may include a first wireless earphone, a second wireless earphone, and a cradle on which the first wireless earphone and the second wireless earphone are seated. The cradle may include a control device including a processor, a memory operatively coupled to the processor, communication modules configured to connect communication with an external terminal and/or communication between the first wireless earphone and the second wireless earphone according to the processor, and a power supply for charging batteries of the first wireless earphone and the second wireless earphone. The control device transmits a location finding alarm command from the external terminal to at least one of the first wireless earphone and/or the second wireless earphone in a wired communication method. In addition, various embodiments may be possible.

19 Claims, 13 Drawing Sheets

(58) Field of Classification Search
USPC ........................................... 381/74, 328, 380
See application file for complete search history.

(56) References Cited

U.S. PATENT DOCUMENTS

| | | | | |
|---|---|---|---|---|
| 2015/0341901 | A1 | 11/2015 | Ryu et al. | |
| 2017/0094394 | A1* | 3/2017 | McPeak ............... | H04R 1/1025 |
| 2018/0199138 | A1* | 7/2018 | Dusan ................. | H04M 1/6008 |
| 2020/0107100 | A1 | 4/2020 | Stanley et al. | |

FOREIGN PATENT DOCUMENTS

| | | | | | |
|---|---|---|---|---|---|
| CN | 111971985 | A | | 11/2020 | |
| CN | 112437378 | A | * | 3/2021 | ........... A45C 11/001 |
| CN | 113068114 | A | | 7/2021 | |
| CN | 113259802 | A | | 8/2021 | |
| CN | 113596800 | A | | 11/2021 | |
| CN | 113645352 | A | | 11/2021 | |
| KR | 10-1246990 | B1 | | 3/2013 | |
| KR | 10-2015-0135057 | A | | 12/2015 | |
| KR | 10-2018-0093372 | A | | 8/2018 | |
| KR | 10-2251322 | B1 | | 5/2021 | |

OTHER PUBLICATIONS

Written Opinion (PCT/ISA/237) issued Apr. 12, 2023 from the International Searching Authority in International Application No. PCT/KR2023/000155.

Communication issued Dec. 18, 2024 by the European Patent Office in European Patent Application No. 23737372.5.

* cited by examiner

FIG. 5

| | WIRELESS EARPHONE 1 (LEFT) | WIRELESS EARPHONE 2 (RIGHT) |
|---|---|---|
| EMBODIMENT 1 | LOCATED INSIDE CRADLE | LOCATED INSIDE CRADLE |
| EMBODIMENT 2 | WORN ON USER'S EAR | WORN ON USER'S EAR |
| EMBODIMENT 3 | LOCATED OUTSIDE | LOCATED OUTSIDE |
| EMBODIMENT 4 | WORN ON USER'S EAR | LOCATED INSIDE CRADLE |
| EMBODIMENT 5 | LOCATED INSIDE CRADLE | LOCATED OUTSIDE |
| EMBODIMENT 6 | WORN ON USER'S EAR | LOCATED OUTSIDE |
| EMBODIMENT 7 | LOCATED INSIDE CRADLE | WORN ON USER'S EAR |
| EMBODIMENT 8 | LOCATED OUTSIDE | LOCATED INSIDE CRADLE |
| EMBODIMENT 9 | LOCATED OUTSIDE | WORN ON USER'S EAR |

ELECTRONIC DEVICE INCLUDING WIRELESS EARPHONE AND CRADLE, AND METHOD OF OPERATING THE SAME

CROSS REFERENCES TO RELATED APPLICATIONS

This application is a by-pass continuation of International Application No. PCT/KR2023/000155, filed on Jan. 4, 2023, in the Korean Intellectual Property Receiving Office, which is based on and claims priority to Korean Application No. 10-2022-0002306, filed on Jan. 6, 2022, and to Korean Application No. 10-2022-0062704, filed on May 23, 2022, in the Korean Intellectual Property Office, the entire disclosures of which are incorporated herein by reference.

TECHNICAL FIELD

Various embodiments of the present disclosure relate to an electronic device including a wireless earphone capable of performing a location finding function of the wireless earphone and a cradle, and a method of operating the same.

BACKGROUND

With the development of digital technology, various types of electronic devices such as a mobile communication terminal, a smartphone, a tablet personal computer (PC), a personal digital assistant (PDA), an electronic organizer, a notebook, a wearable device, an internet of things (IoT) device, or an audible device are widely used. Among the electronic devices, the wearable device (e.g., a wireless earphone) is becoming an essential device in daily life. The electronic device may be connected to various types of hearing devices (or audio output devices) (e.g., wired headphones, wired earphones, wireless headphones, or wireless earphones). The electronic device may output reproduced audio data (e.g., a sound source) through the connected hearing device, and the user may listen to the audio data of the electronic device through the hearing device. The electronic device and the hearing device may be connected through a wired interface (e.g., connector connection) or a wireless interface (e.g., Bluetooth connection). Recently, as the hearing device, wireless earphones operating in pairs have been developed. In the case of such a wireless earphone, it may be configured by a first wireless earphone (e.g., a left wireless earphone) and a second wireless earphone (e.g., a right wireless earphone) respectively worn on both ears of the user.

The above information is provided only as background information to aid understanding of the present disclosure. No determination has been made and no claim has been made as to whether any of the above may be applied as prior art with respect to the present disclosure.

Technical Problem

When a wireless earphone (e.g., earbuds) is seated in a charging cradle, it may enter a sleep mode or shutdown mode to save battery charge. When the wireless earphone enters the sleep mode or shutdown mode, Bluetooth communication between the wireless earphone and a terminal (e.g., a smartphone) is blocked, and the user is unable to perform state information of the wireless earphone and connection with the wireless earphone. Because the connection with the wireless earphone is impossible, the user may not perform the remote operation for the location finding function of the wireless earphone while the wireless earphone is seated inside the cradle. Also, when the wireless earphone is in the sleep mode, the wireless earphone may attempt to connect to the terminal through a wake up operation. In this case, since only a one-way connection function from the wireless earphone to the terminal may be provided, the user's terminal cannot connect to the wireless earphone at a specific time.

According to various embodiments of the present disclosure, a terminal (e.g., smartphone, smart watch, tablet PC, or notebook PC) may be connected to a communication module (e.g., a Bluetooth low energy (BLE) communication module) built into a cradle, and output an alarm for finding the location of wireless earphones.

According to various embodiments of the present disclosure, the communication module (e.g., Bluetooth low energy (BLE) communication module) built into the cradle is connected to the terminal (e.g., smartphone, smart watch, tablet PC, notebook PC), so that remote control implementation functions such as checking the status of wireless earphones can be performed.

According to various embodiments of the present disclosure, to prevent loss of wireless earphones using Bluetooth or BLE connection status or to prevent forgetting to bring wireless earphones when going out, the function of providing information such as a pop-up message may be performed through a program (e.g., application software for wireless earphone control) built into a terminal (e.g., a smartphone, a smart watch, a tablet PC, or a notebook PC).

The technical problems to be solved in this document are not limited to the technical problems mentioned above, and other technical problems not mentioned can be clearly understood by those of ordinary skill in the art to which this document belongs from the description below.

Additional aspects will be set forth in part in the description that follows, and in part will be apparent from the description, or may be understood by way of the embodiments presented.

SUMMARY

An electronic device accordance with embodiments of the present disclosure may include: a first wireless earphone, a second wireless earphone, and a cradle on which the first wireless earphone and the second wireless earphone are disposed. The cradle may include a control device including a processor, a memory operatively coupled to the processor, communication modules configured to communicate with an external terminal and/or communication between the first wireless earphone and the second wireless earphone, and a power supply for charging a battery of the first wireless earphone and a battery of the second wireless earphone. The control device transmits a location finding alarm command from the external terminal to at least one of the first wireless earphone and/or the second wireless earphone in a wired or wireless communication method.

An electronic device accordance with embodiments of the present disclosure may include: a wireless communication module for communication connection with an external device including a plurality of wireless earphones and a cradle on which the plurality of wireless earphones are disposed, a processor operatively coupled to the wireless communication module, and a memory operatively connected to the processor and storing a program for controlling the operation of the external device. The memory may include instructions, when executed, for controlling the processor to: check the communication connection with the cradle and the plurality of wireless earphones, and control the cradle and the plurality of wireless earphones so that a location finding alarm is output from the plurality of wireless earphones based on the positions of the plurality of wireless earphones. A non-transitory computer-readable medium storing instructions may be provided. The instructions may include one or more instructions that, when executed by one or more processors of a device cause the one or more processors to check a communication connection with a cradle and a plurality of wireless earphones; and control the cradle and the plurality of wireless earphones so that a location finding alarm is output from at least one of the plurality of wireless earphones based on a position of the at least one of the plurality of wireless earphones, wherein the device comprises a wireless communication module, and wherein the wireless communication module is configured to communicate with an external device and the cradle and the plurality of wireless earphones.

In an electronic device according to various embodiments of the present disclosure, a terminal (e.g., smartphone, smart watch, tablet PC, or notebook PC) may be connected to a communication module (e.g., a Bluetooth low energy (BLE) communication module) built into a cradle, and output an alarm for finding the location of wireless earphones.

In an electronic device according to various embodiments of the present disclosure, the communication module (e.g., Bluetooth low energy (BLE) communication module) built into the cradle is connected to the terminal (e.g., smartphone, smart watch, tablet PC, notebook PC), so that a remote control implementation function of checking the state of the wireless earphones (e.g., the battery charging state of the wireless earphone or the charging state of the cradle battery) may be periodically performed. Through this, the battery charge state of the wireless earphones or the battery charge state of the cradle may be determined, so that the necessity of charging the battery may be notified before the battery is discharged.

An electronic device according to various embodiments of the present disclosure may provide information such as a pop-up message through a program (e.g., application software for controlling wireless earphones) built in a terminal (e.g., a smartphone, a smart watch, a tablet PC, or a notebook PC) to prevent loss of wireless earphones using Bluetooth or BLE connection status or not to forget to carry wireless earphones when going out.

In addition, various effects directly or indirectly identified through this document may be provided.

BRIEF DESCRIPTION OF THE DRAWINGS

Other aspects, advantages and salient features of the present disclosure will become apparent to those skilled in the art from the following detailed description, which, taken in conjunction with the accompanying drawings, discloses various embodiments of the present disclosure.

FIG. 5 is a diagram illustrating a method of operating an electronic device according to positions of wireless earphones.

Throughout the drawings, like reference numbers will be understood to refer to like parts, components, and structures.

DETAILED DESCRIPTION

The following description with reference to the accompanying drawings is provided to aid a comprehensive understanding of various embodiments of the present disclosure as defined by the claims and their equivalents. Various specific details are included herein to aid understanding, but these should be considered exemplary only. Accordingly, those skilled in the art will recognize that various changes and modifications of the various embodiments described herein may be made without departing from the scope and spirit of the present disclosure. In addition, descriptions of well-known functions and configurations may be omitted for clarity and conciseness.

The terms and words used in the following description and claims are not limited to their bibliographical meanings, but are used solely by the inventors to enable a clear and consistent understanding of the present invention. Accordingly, it should be apparent to those skilled in the art that the following description of various embodiments of the present invention is provided for purposes of illustration only and not for the purpose of limiting the invention as defined by the appended claims and their equivalents.

Singular forms of expressions are to be understood to include plural referents unless the context clearly dictates otherwise. Thus, for example, reference to "component surface" may include reference to one or more of such surfaces.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

In the description, the term "A or B", "at least one of A or B", "at least one of A and B", or "one or more of A or/and B" may include all possible combinations of the items that are enumerated together. For example, the term "A or B" or "at least one of A or/and B" may designate (1) only A, (2) only B, or (3) both A and B.

The expression "1", "2", "first", or "second" as used herein may modify a variety of elements, irrespective of order and/or importance thereof, and to distinguish one element from another, without limiting the corresponding elements.

Figure 1:
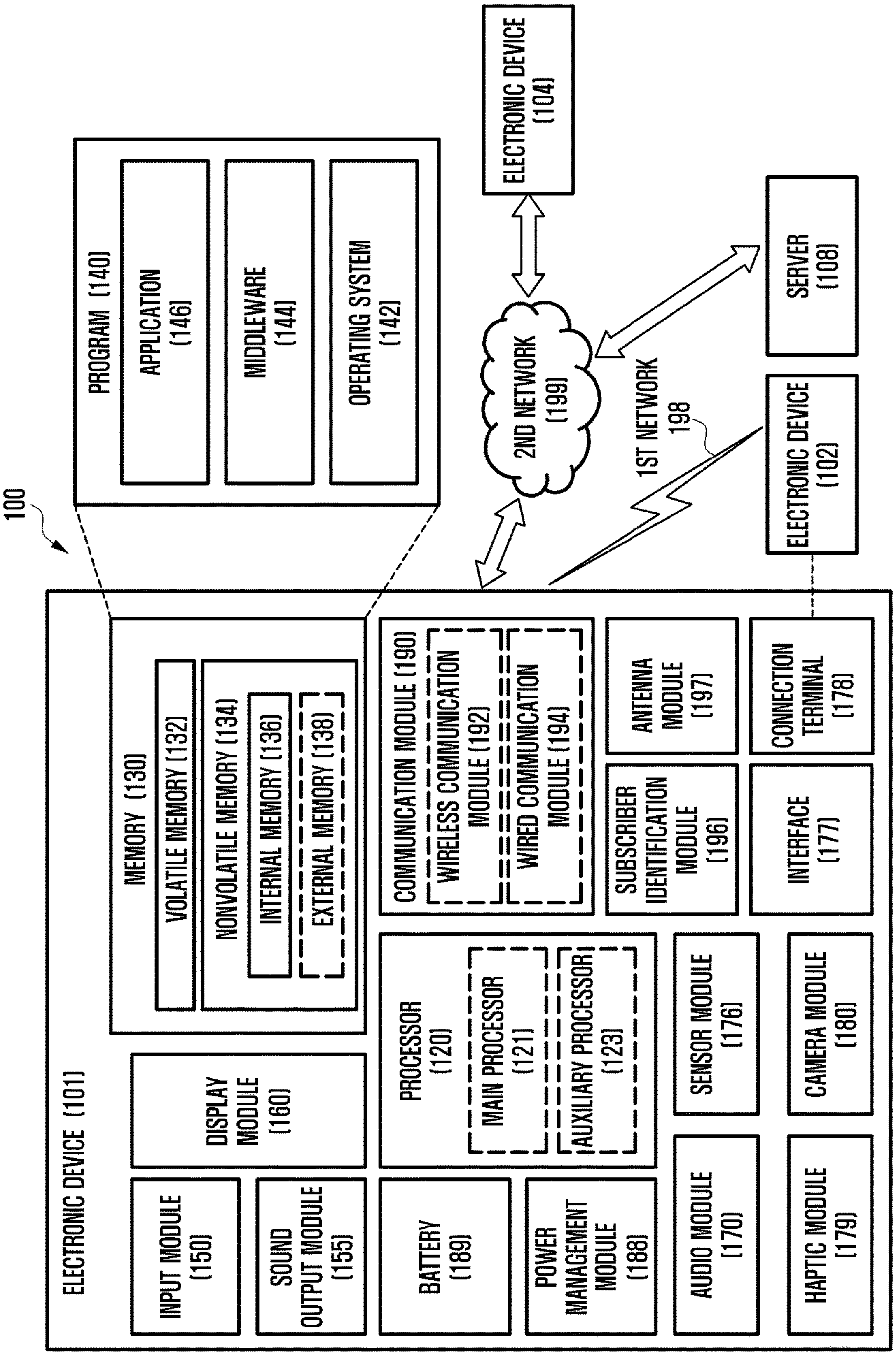
FIG. 1 is a block diagram of an electronic device in a network environment according to various embodiments of the present disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, the display module 160 may include a flexible display configured to be folded or unfolded.

According to an embodiment, the display module 160 may include a flexible display that is slidably disposed to provide a screen (e.g., a display screen).

According to an embodiment, the display module 160 may be referred to as a variable display (e.g., a stretchable display), an expandable display, or a slide-out display.

According to an embodiment, the display module 160 may include a bar type display or a plate type display.

Figure 2A:
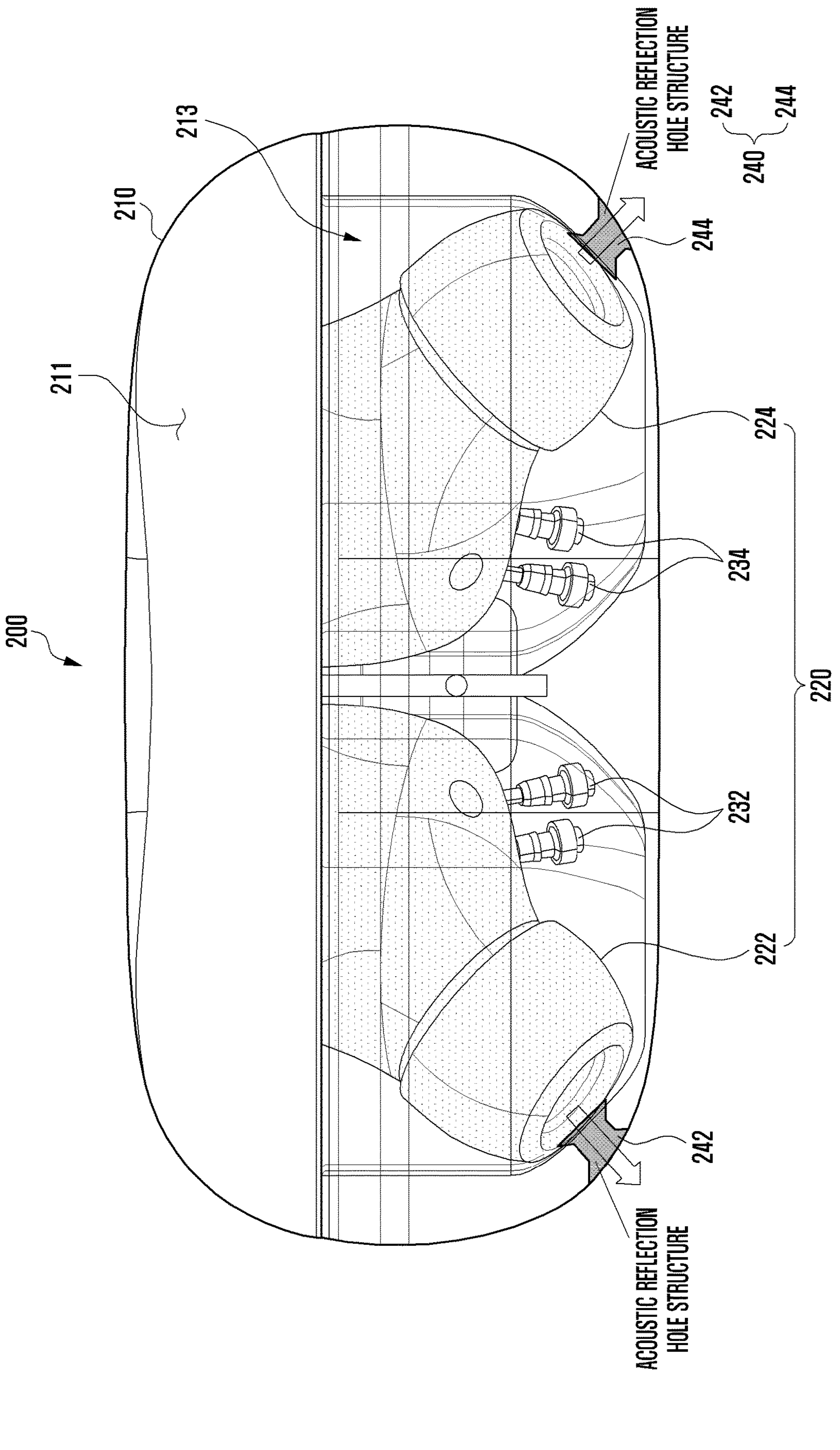
FIG. 2A is a diagram illustrating an electronic device including wireless earphones and a cradle according to embodiments of the present disclosure.
Figure 2B:
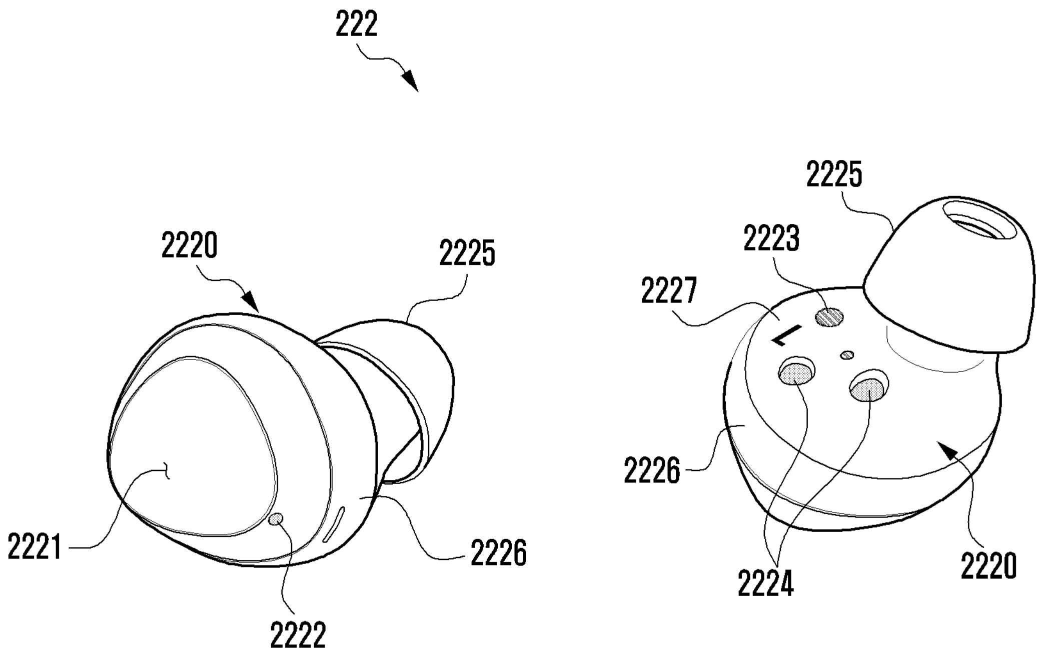
FIG. 2B is a diagram illustrating a first wireless earphone (e.g., a left wireless earphone) according to embodiments of the present disclosure.
Figure 2C:
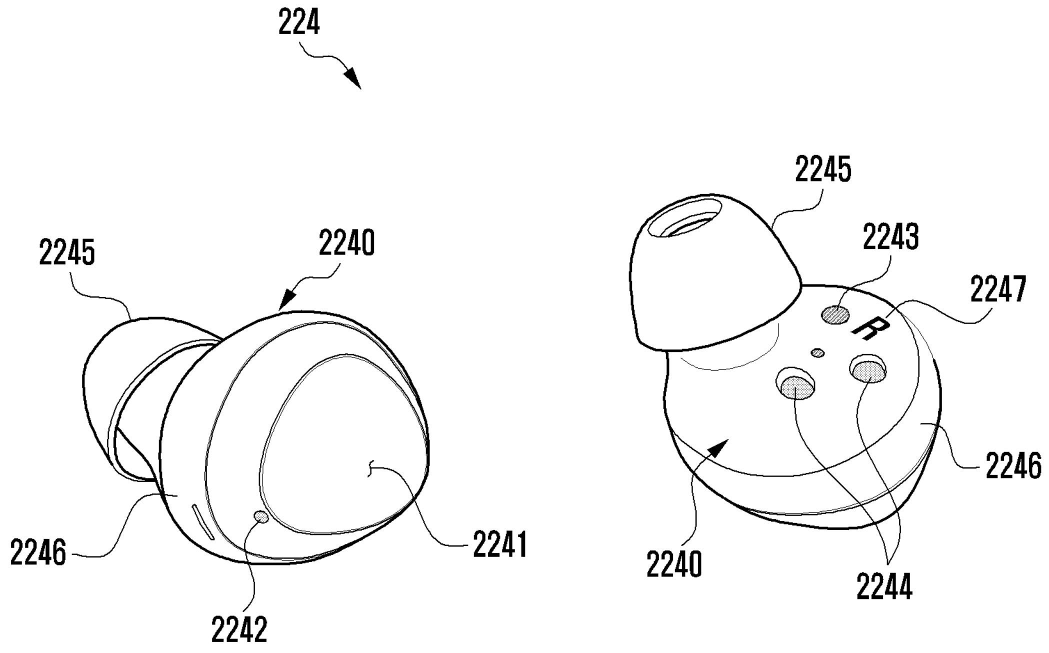
FIG. 2C is a diagram illustrating a second wireless earphone (e.g., a right wireless earphone) according to embodiments of the present disclosure.
Figure 2D:
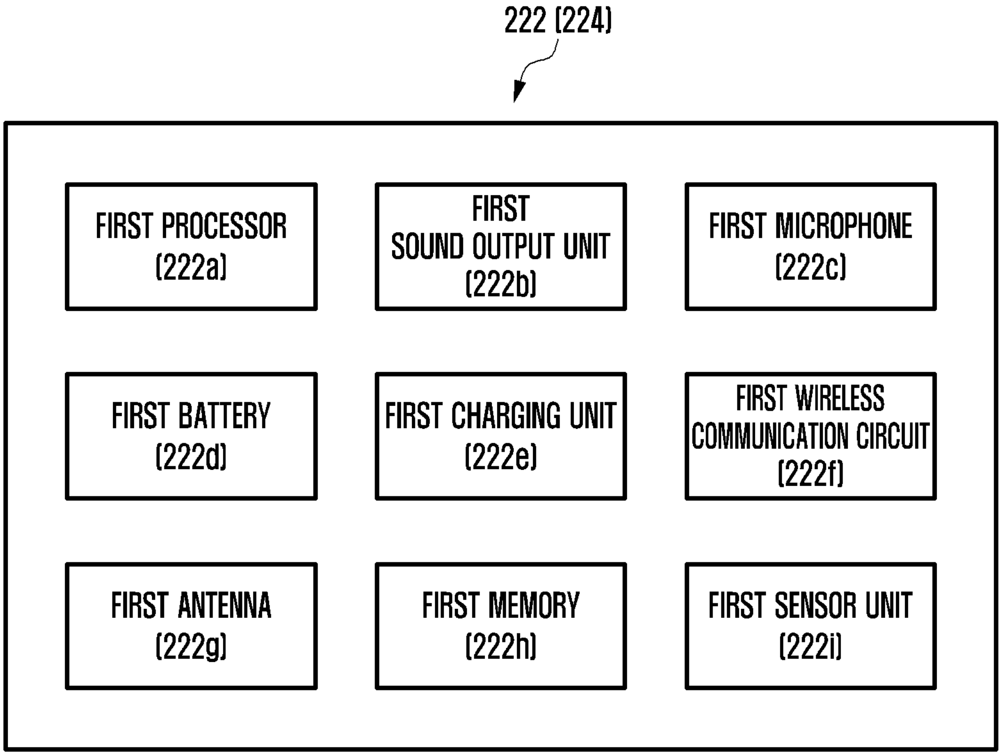
FIG. 2D is a block diagram of a wireless earphone (a first wireless earphone or a second wireless earphone).

FIG. 2A is a diagram illustrating an electronic device including a wireless earphone and a cradle according to embodiments of the present disclosure. FIG. 2B is a diagram illustrating a first wireless earphone (e.g., a left wireless earphone) according to embodiments of the present disclosure. FIG. 2C is a diagram illustrating a second wireless earphone (e.g., a right wireless earphone) according to embodiments of the present disclosure. FIG. 2D is a block diagram of a first wireless earphone (or a second wireless earphone).

Referring to FIGS. 2A to 2D, the electronic device 200 (e.g., an external device) according to various embodiments of the present disclosure may include a cradle 210 (e.g., a case) (e.g., a charging device) and a plurality of wireless earphones 220. According to an embodiment, the plurality of wireless earphones 220 may include a first wireless earphone 222 (e.g., a left wireless earphone, a central (primary, or main) wireless earphone), or a main wireless earphone) and a second wireless earphone 224 (e.g., a right wireless earphone or a peripheral (or secondary) wireless earphone). As an example, when the first wireless earphone 222 may operate as a central (primary, or main) wireless earphone, the second wireless earphone 224 may operate as a peripheral (or secondary) wireless earphone. As another example, when the second wireless earphone 224 may operate as a central (primary, or main) wireless earphone, the first wireless earphone 222 may operate as a peripheral (or secondary) wireless earphone. For example, the plurality of wireless earphones 220 may be disposed in the receiving part 213 of the cradle 210 during charging, and may be located outside the cradle 210 when in use.

As an embodiment, the cradle 210 may operate in association with a plurality of wireless earphones 220 and an external electronic device (e.g., the electronic device 101 of FIG. 1, the electronic device 300 of FIG. 3) (e.g., a terminal). As another example, the cradle 210 may operate in connection with the external electronic devices 101 and 300 (e.g., a terminal) regardless of the plurality of wireless earphones 220. As another example, the cradle 210 may operate in association with the plurality of wireless earphones 220 irrespective of the electronic devices 101 and 300 (e.g., a terminal).

As an embodiment, at least one of the plurality of wireless earphones 220 may operate in connection with the cradle 210 and the external electronic devices 101 and 300 (e.g., a terminal). As another example, at least one of the plurality of wireless earphones 220 may operate in association with the external electronic devices 101 and 300 (e.g., a terminal) regardless of the cradle 210. As another example, at least one of the plurality of wireless earphones 220 may operate in association with the cradle 210 regardless of the external electronic devices 101 and 300 (e.g., a terminal).

According to an embodiment, the first wireless earphone 222 may include a first housing (or main body) 2220, a first touchpad 2221, a first microphone 2222, a first touch-sensitive sensor 2223, a first charging contact 2224, a first ear tip 2225, a first wing tip 2226, and/or a first direction/size indicator 2227 (e.g., L).

According to an embodiment, the second wireless earphone 224 may include a second housing 2240, a second touchpad 2241, a second microphone 2242, a second touch-sensitive sensor 2243, a second charging contacts 2244, a second ear tip 2245, a second wing tip 2246, and/or a second direction/size indicator 2247 (e.g., R).

According to an embodiment, the first wireless earphone 222 may include a first processor 222*a*, a first sound output unit 222*b* (e.g., speaker/receiver), a first microphone 222*c*, a first battery 222*d*, a first charging unit 222*e*, a first wireless communication circuitry 222*f* (e.g., wireless communication circuitry), a first antenna 222*g*, a first memory 222*h*, and/or a first sensor unit 222*i* (e.g., a wear detection sensor, a biometric sensor, a gyro sensor, a geomagnetic sensor, a GPS sensor, a body temperature sensor, a moisture sensor, a barometric pressure sensor, and/or a touch sensor) in the first housing 2220.

According to an embodiment, the first wireless earphone 222 and the second wireless earphone 224 may be formed as a set of two, and may each include a corresponding component. As an embodiment, the second wireless earphone 224 may include a second processor, a second sound output unit (e.g., speaker/receiver), a second microphone, a second battery (e.g., the second battery 224*d* of FIG. 3), a second charging unit, a second wireless communication circuitry (e.g., wireless communication circuitry), a second antenna, a second memory, and/or a second sensor unit (e.g., a wear detection sensor, a biometric sensor, a gyro sensor, a geomagnetic sensor, a GPS sensor, a body temperature sensor, a moisture sensor, a barometric pressure sensor, and/or a touch sensor) which perform the same (or similar) function as the first wireless earphone 222 in the second housing 2220.

All or part of the components of the first wireless earphone 222 and the second wireless earphone 224 may be the same, and components corresponding to each other may be collectively described. As an embodiment, the components of the first wireless earphone 222 shown in FIG. 2D are may or may not be essential, and other components may be further included in the components shown in FIG. 2D, or some components may not be included.

According to an embodiment, the first processor 222*a* and/or the second processor may control the operation of the first wireless earphone 222 and/or the second wireless earphone 224. As an example, the first processor 222*a* and/or the second processor may include processing circuitry or control circuitry such as a micro controller unit (MCU), a central processing unit (CPU), a sensor processor, a sensor hub, an application processor (AP), and/or a communication processor (CP) processor). For example, the first processor 222*a* and/or the second processor may control the components included in the electronic device (e.g., the electronic device 101 of FIG. 1, the electronic device 300 of FIG. 3) or the cradle 210 (e.g., the cradle 210 of FIG. 3), and may perform various data processing or operations.

As an embodiment, the first processor 222*a* and/or the second processor may determine the wearing state of the first wireless earphone 222 and/or the second wireless earphone 224, based on sensor data (or sensing information) (e.g., proximity information, posture information, and/or touch information) obtained from the sensor circuitry (e.g., the first sensor unit 220*i* and/or the second sensor unit).

As an embodiment, the first processor 222*a* and/or the second processor may change the operation mode of the first wireless earphone 222 and/or the second wireless earphone 224 and control communication with the electronic devices 101 and 300 (e.g., a terminal), based on the sensor data (or sensing information) obtained from the sensor circuitry (e.g., the first sensor unit 220*i* and/or the second sensor unit).

As an embodiment, the first processor 222*a* and/or the second processor may control to execute an application (e.g., a music player) stored in the memories 130 and 330 of the electronic device 101 or 300 and to play audio data stored in the memory to output sound.

According to an embodiment, the first processor 222*a* and/or the second processor may seamlessly control a link operation with the cradle 210 and/or the external electronic devices 101 and 300, based on the wearing state of the first wireless earphone 222 and/or the second wireless earphone 224 and the state of charge of the first battery 222*d* of the first wireless earphone 222 and/or the second battery 224*d* of the second wireless earphone 224.

As an embodiment, the first wireless earphone 222 and the second wireless earphone 224 may include a speaker. For example, the first wireless earphone 222 and/or the second wireless earphone 224 may output an audio signal (e.g., sound) through the speaker of the first sound output unit 222*d* and/or the second sound output unit.

According to an embodiment, the first sound output unit 222*b* and/or the second sound output unit may output the acoustic signal (or audio signal) received from the external electronic device (e.g., the electronic device 300 of FIG. 3) (e.g., a terminal) or the acoustic signal (or audio signal) received from the cradle 210 (e.g., the cradle 210 of FIG. 3) to the outside (e.g., the user's ear). According to an embodiment, the first sound output unit 222*b* or the second sound output unit may output an acoustic signal executed by the first wireless earphone 222 or the second wireless earphone 224 to the outside (e.g., the user's ear).

As an embodiment, the first sound output unit 222*b* and/or the second sound output unit may output audio data received from a wireless communication module (e.g., the wireless communication module 192 of FIG. 1, the wireless communication module 310 of FIG. 3) of an electronic device (e.g., the electronic device 300 of FIG. 3) (e.g., a terminal) to the outside (e.g., the user's ear). For example, the first sound output unit 222*b* or the second sound output unit may output audio data stored in a memory (e.g., the memory 130 of FIG. 1, the memory 330 of FIG. 3) of an electronic device (e.g., the electronic device 300 of FIG. 3) (e.g., the terminal) to the outside (e.g., the user's ear). For example, the first sound output unit 222*b* or the second sound output unit may output audio data stored in the first memory 222*h* or in the second memory to the outside (e.g., the user's ear).

In some embodiments, the first sound output unit 222*b* and/or the second sound output unit may output sound signals related to various operations (or functions) performed in an electronic device (e.g., the electronic device 300 of FIG. 3) (e.g., a terminal). The first sound output unit 222*b* or the second sound output unit according to an embodiment may be the same as or similar to the sound output module 155 of FIG. 1.

As an embodiment, the first wireless earphone 222 may include a first microphone 222*c* (e.g., the microphone 2222 of FIG. 2B). The second wireless earphone 224 may include a second microphone (e.g., the microphone 2242 of FIG. 2C). For example, the first wireless earphone 222 and/or the second wireless earphone 224 may receive (or input) an audio signal (e.g., sound) from the outside through the first microphone 222*c* and/or the second microphone.

According to an embodiment, the first microphone 222*c* and/or the second microphone may receive (or acquire) an acoustic signal (e.g., sound) from an external (e.g., user). The first microphone 222*c* and/or the second microphone may receive an external acoustic signal and process the same to electrical voice data. For example, various noise reduction algorithms for removing noise generated in the process of receiving an external acoustic signal may be implemented in the first microphone 222*c* and/or the second microphone. In some embodiments, the first microphone 222*c* or the second microphone may be responsible for inputting audio streaming, such as a voice command.

The first charging unit 220*e* and/or the second charging unit according to an embodiment may receive external power and/or internal power under the control of the first processor 222*a* and/or the second processor to supply power necessary for the operation of each component, and may charge the first battery 222*d* and/or the second battery 224*d*. For example, the first charging unit 220*e* and/or the second charging unit may supply or cut off (on/off) power to the first wireless communication circuitry 222*f* and/or the second wireless communication circuitry under the control of the first processor 222*a* and/or the second processor. For example, the first charging unit 220*e* and/or the second charging unit may supply or turn off (on/off) power to the first sensor unit 222*i* and/or the second sensor unit under the control of the first processor 222*a* and/or the second processor.

As an embodiment, the first charging unit 220*e* and the second charging unit may include a power management integrated circuit (PMIC). As an embodiment, the first charging unit 220*e* and the second charging unit may include a battery controlling/processing circuitry, a charging circuit (charger IC), and/or a boosting circuit for controlling the charging of the first battery 222*d* and/or the second battery 224*d*.

As an embodiment, the first battery 222*d* and/or the second battery 224*d* may include a non-rechargeable primary cell, a rechargeable secondary cell, or a fuel cell.

As an embodiment, the first wireless communication circuitry 222*f* of the first wireless earphone 222 and/or the second wireless communication circuitry of the second wireless earphone 224 may include the same or similar components as the wireless communication module 192 of FIG. 1. For example, the first wireless communication circuitry 222*f* and the second wireless communication circuitry may establish a wireless communication channel with each other and perform communication using the established communication channel. For example, the first wireless communication circuitry 222*f* and/or the second wireless communication circuitry may include one or more communication circuitry that enables wireless communication between the cradles 210 (e.g., the cradle 210 of FIG. 3). For example, the first wireless communication circuitry 222*f* (or the second wireless communication circuitry) may establish a wireless communication channel with an external electronic device (e.g., the electronic device 300 of FIG. 3) (e.g., a terminal) and perform communication using the established communication channel.

As an embodiment, the first wireless communication circuitry 222*f* and the second wireless communication circuitry may be connected to each other using Bluetooth, Bluetooth low energy (BLE), power line communication (PLC), Wi-Fi, adaptive network topology (ANT+), long term evolution (LTE), 5th generation mobile telecommunication (5G), and/or narrowband internet of things (NB-IoT).

As an embodiment, the first wireless communication circuitry 222*f* and the second wireless communication circuitry may be connected to an external electronic device (e.g., the electronic device 101 of FIG. 1, the electronic device 300 of FIG. 3) (e.g., a terminal) using Bluetooth, Bluetooth Low Energy (BLE), Wi-Fi, ANT+, LTE, 5G, and/or NB-IoT.

In some embodiments, the first wireless communication circuitry 222*f* and the second wireless communication circuitry may be connected to an access point (AP) or another network using Bluetooth, Bluetooth low energy (BLE), Wi-Fi, ANT+, LTE, 5G, and/or NB-IoT.

As an embodiment, the first wireless communication circuitry 222*f* and/or the second wireless communication circuitry may interwork with external devices 101 and 300 that are connected (e.g., paired) through a designated network (e.g., short-range communication network) or with each other to transmit or receive various data through the first antenna 222*g* and the second antenna. According to an embodiment, the first wireless communication circuitry 222*f* or the second wireless communication circuitry may maintain an always-on state, or may be turned on or off according to a preconfigured operation or a user input.

According to an embodiment, the first antenna 222*g* and/or the second antenna may transmit signals or power to each other and/or to the external electronic devices 101 and 300, or may receive power from the outside.

As an embodiment, the first antenna 222*g* and/or the second antenna may include one or more antennas including a conductor formed on a substrate (e.g., a PCB) or a radiator formed of a conductive pattern. In some embodiments, other components (e.g., RFIC) other than the radiator may be additionally formed as a part of the first antenna 222*g* (or the second antenna).

According to an embodiment, the first sensor unit 220*i* (or the second sensor unit) may include touch circuits (or touch sensors) disposed on a portion of the substrate inside the touch pad to detect a user's touch (or touch signal) on the first touch pad 2221 (or the second touch pad 2241).

According to an embodiment, the first memory 222*h* and/or the second memory may store one or more programs (or applications) executed by a processor (e.g., the processor 120 of FIG. 1 and the processor 320 of FIG. 3) of an external electronic device (e.g., the electronic device 101 of FIG. 1, the electronic device 300 of FIG. 3), and may permanently and/or temporarily store data input/output from the electronic devices 101 and 300. Data input/output from the electronic devices 101 and 300 may include, for example, audio streaming, voice commands, mode configurations, and/or status information. According to an embodiment, the first memory 222*h* and/or the second memory may store data acquired in real time in a temporary storage device, and may store data determined to be stored in a storage device capable of storing for a long time.

According to an embodiment, the first sensor unit 220*i* and/or the second sensor unit may be the same as or similar to the sensor module 176 of FIG. 1. According to an embodiment, the first sensor unit 220*i* and/or the second sensor unit may include at least one sensor (e.g., an inertial sensor (e.g., an acceleration sensor, a geomagnetic sensor, a gyro sensor)) capable of generating data used to detect movement, impact strength, and/or position of the electronic device 101, 300 and to determine movement, shock strength, and/or position.

As an embodiment, the first sensor unit 220*i* (or the second sensor unit) may include at least one sensor (e.g., a wear detection sensor) capable of detecting whether the first wireless earphone 222 (or the second wireless earphone 224) is worn on the user's body, and generating data used to determine whether the first wireless earphone 222 is worn on the body.

As an embodiment, the sensing data (or sensing information) according to the sensing result of the first sensor unit 220*i* and/or the second sensor unit may be provided to the processors 120 and 320 of the electronic devices 101 and 300.

According to an embodiment, the first sensor unit 220*i* and/or the second sensor unit may include a touch circuit (or a touch sensor) to sense a touch (or a touch signal). For example, the touch circuit may include a capacitive touch sensor or a pressure sensitive touch sensor, and may sense a single touch, a multi touch, a surface touch, and/or a palm touch.

In various embodiments, the first wireless earphone 222 and/or the second wireless earphone 224 may communicate with the external electronic devices 101 and 300 (e.g., a smartphone and/or a tablet PC).

According to an embodiment, the external electronic devices 101 and 300 may be connected to a wireless earphone operating as a central (or primary, or main) between the first wireless earphone 222 and/or the second wireless earphone 224.

According to an embodiment, the external electronic devices 101 and 300 may be connected to the cradle 210.

As an embodiment, the external electronic devices 101 and 300 may be connected with each of the first wireless earphone 222 and the second wireless earphone 224, based on multi connection. For example, the first wireless earphone 222 and the second wireless earphone 224 may be paired with the external electronic devices 101 and 300 wirelessly (e.g., RF, BT, or BLE). For example, the first wireless earphone 222 and the second wireless earphone 224 may receive the audio signal related to a function (e.g., playing music, receiving a call, receiving an alarm, or receiving a sound through the microphone of the external electronic device 101 or 300) executed by the connected external electronic device 101 or 300, and may convert an audio signal into sound and output the sound to the outside.

As an embodiment, the configuration and operating states of the first wireless earphone 222 and the second wireless earphone 224 may be changed through the external electronic devices 101 and 300. For example, the volume of the first wireless earphone 222 and the second wireless earphone 224 may be adjusted through the external electronic devices 101 and 300. In some embodiments, the first wireless earphone 222 and the second wireless earphone 224 may configure an operation mode through various sensors (e.g., an acceleration sensor, a gyro sensor, a biometric sensor, and/or a proximity sensor).

Referring again to FIGS. 2B and 2C, as an embodiment, the first ear tip 2225 and the first wing tip 2226 may be disposed outside the first housing 2220 to be detachably attached to the first housing 2220.

As an embodiment, the second ear tip 2245 and the second wing tip 2246 may be disposed outside the second housing 2240 to be detachably attached to the second housing 2240.

As an embodiment, the first ear tip 2225 and the second ear tip 2245 may be provided in various sizes (e.g., SS, S, M, L or XL) of an elastic material (e.g. foam material (e.g. sponge material) or silicone material) that fits into the user's ear, and may have a structure to fit into a protruding portion (e.g., a speaker portion) of the corresponding housings 2220 and 2240.

As an embodiment, the first wingtip 2226 and the second wingtip 2246 may be for fixing and seating the wireless earphones 222 and 224 in the user's ear, and may provide a comfortable fit, clear sound, and noise blocking role of the user's wireless earphones 222 and 224.

As an embodiment, the first wingtip 2226 and the second wingtip 2246 may be provided in the form of a ring of various sizes (e.g., SS, S, M, L or XL) made of a silicone material. As an embodiment, the first wingtip 2226 and the second wingtip 2246 may have a structure in which the housings 2220 and 2240 are enclosed in a fastening structure (or fixing member) (e.g., locking groove, fastening groove, ring groove, or guide groove) surrounding a portion (e.g., the outer part of the housing 2220 and 2240) of the housing 2220 and 2240.

As an embodiment, ear tips 2225 and 2245 and wingtips 2226 and 2246 may be engraved with a direction indicator (e.g., L or R) on any part of the surface. According to some embodiments, the wingtips 2226 and 2246 in the wireless earphones 222 and 224 may not be included.

As an embodiment, the first housing 2220 may include a fastening structure in which the first wingtip 2226 is detachable, and the first wingtip 2226 may be fixedly fastened (or fitted) to the fastening structure of the first housing 2220. As an embodiment, the second housing 2240 may include a coupling structure in which the second wingtip 2246 is detachable, and the second wingtip 2246 may be fixedly fastened (or fitted) to the fastening structure of the second housing 2240.

Hereinafter, the first wireless earphone 222 will be described as a 'central (or primary, or main) wireless earphone', and the second wireless earphone 224 will be described as a 'peripheral (or secondary) wireless earphone'. However, various embodiments are not limited thereto, and the role of the central (or, primary, or main) earphone of the first wireless earphone 222 and the role of the peripheral (or secondary) wireless earphone of the second wireless earphone 224 may be periodically or selectively changed (e.g., changed according to status information, whether worn or not, or battery level). For example, in order to reduce the difference in battery consumption between the first wireless earphone 222 and the second wireless earphone 224, the role of the central (or, primary, or main) or peripheral (or secondary) may be changed (or switched).

According to an embodiment, the first wireless earphone 222 serves as a central (or, primary, or main), and the second wireless earphone 224 may serve as a peripheral (or secondary). According to another embodiment, the first wireless earphone 222 may serve as a peripheral (or secondary), and the second wireless earphone 224 may serve as a central (or primary, or main).

As an embodiment, between the first wireless earphone 222 and the second wireless earphone 224, a central (or primary, or main) wireless earphone (e.g., the first wireless earphone 222) may communicate with an external electronic device (e.g., the electronic device 101 of FIG. 1, the electronic device 300 of FIG. 3) (e.g., a terminal), and the peripheral (or secondary) wireless earphone (e.g., the second wireless earphone 224) may monitor communication performed by the central (or primary or main) wireless earphone (e.g., the first wireless earphone 222) with the external electronic devices 101 and 300 (e.g., the terminal). For example, a central (or primary, or main) wireless earphone (e.g., the first wireless earphone 222) and the electronic devices 101 and 300 (e.g., a terminal) may be connected. Here, the peripheral (or secondary) wireless earphone (e.g., the second wireless earphone 224) may receive communication information for communication connection with the electronic devices 101 and 300 (e.g., a terminal) from a central (or, primary, or main) wireless earphone (e.g., the first wireless earphone 222), and may receive a signal (or data) transmitted by a central (or primary, or main) wireless earphone (e.g., the first wireless earphone 222) and the electronic devices 101 and 300 (e.g., a terminal).

As an embodiment, each of the first wireless earphone 222 and the second wireless earphone 224 may communicate with an external electronic device 101 or 300 (e.g., a terminal). For example, each of the first wireless earphone 222 and the second wireless earphone 224 may individually detect the electronic devices 101 and 300 (e.g., a terminal), and may be communicatively connected to the electronic devices 101 and 300 (e.g., a terminal). As another example, first, the first wireless earphone 222 is connected to the electronic devices 101 and 300 (e.g., a terminal), and the second wireless earphone 224 may receive communication information for communication connection with the electronic devices 101 and 300 (e.g., a terminal) from the first wireless earphone 222 to be communicatively connected to the electronic devices 101 and 300 (e.g., a terminal).

According to an embodiment, the plurality of wireless earphones 220 may perform the corresponding task seamlessly through exchanges regarding assigned tasks (e.g., those that consume current) when switching between the central (or primary, or main) earphone and the peripheral (or secondary) earphone. For example, the plurality of wireless earphones 220 may identify a condition such as a battery level and/or a wearing state, and may seamlessly adjust (or exchange) the task between the first wireless earphone 222 and the second wireless earphone 224, based on the identification condition.

In various embodiments, the first wireless earphone 222 and the second wireless earphone 224 may communicate with each other, based on wireless communication (e.g., Bluetooth communication, or Bluetooth low energy (BLE) communication). In various embodiments, at least one of the first wireless earphone 222 or the second wireless earphone 224 (e.g., central (or, primary, or main)) may communicate with the external devices 101 and 300 (e.g., a terminal), based on wireless communication (such as Bluetooth communication, or Bluetooth low energy (BLE) communication).

In various embodiments, the cradle 210 may communicate with external devices 101 and 300 (e.g., a terminal), based on wireless communication (e.g., Bluetooth communication, or Bluetooth low energy (BLE) communication).

As an embodiment, the control device of the cradle 210 (e.g., the control device 214 of FIG. 3) may sense whether the first wireless earphone 222 is worn on the user's ear through the first wear detection sensor 2223 of the first wireless earphone 222. As an embodiment, the control device of the cradle 210 (e.g., the control device 214 of FIG. 3) may sense whether the second wireless earphone 224 is worn on the user's ear through the second wear detection sensor 2243 of the second wireless earphone 224.

As an embodiment, when the cover of the cradle 210 (e.g., the cover of the housing 211) is opened, Bluetooth (or low-power Bluetooth) communication of the first wireless earphone 222 and/or the second wireless earphone 224 is activated, and the first wireless earphone 222 and/or the second wireless earphone 224 may be paired with the electronic devices 101 and 300 through Bluetooth communication. As another example, when the first wireless earphone 222 and/or the second wireless earphone 224 seated in the cradle 210 comes out of the cradle 210, Bluetooth (or low-power Bluetooth) communication may be activated, and the first wireless earphone 222 and/or the second wireless earphone 224 may be paired with the electronic devices 101 and 300 through Bluetooth communication.

Figure 3:
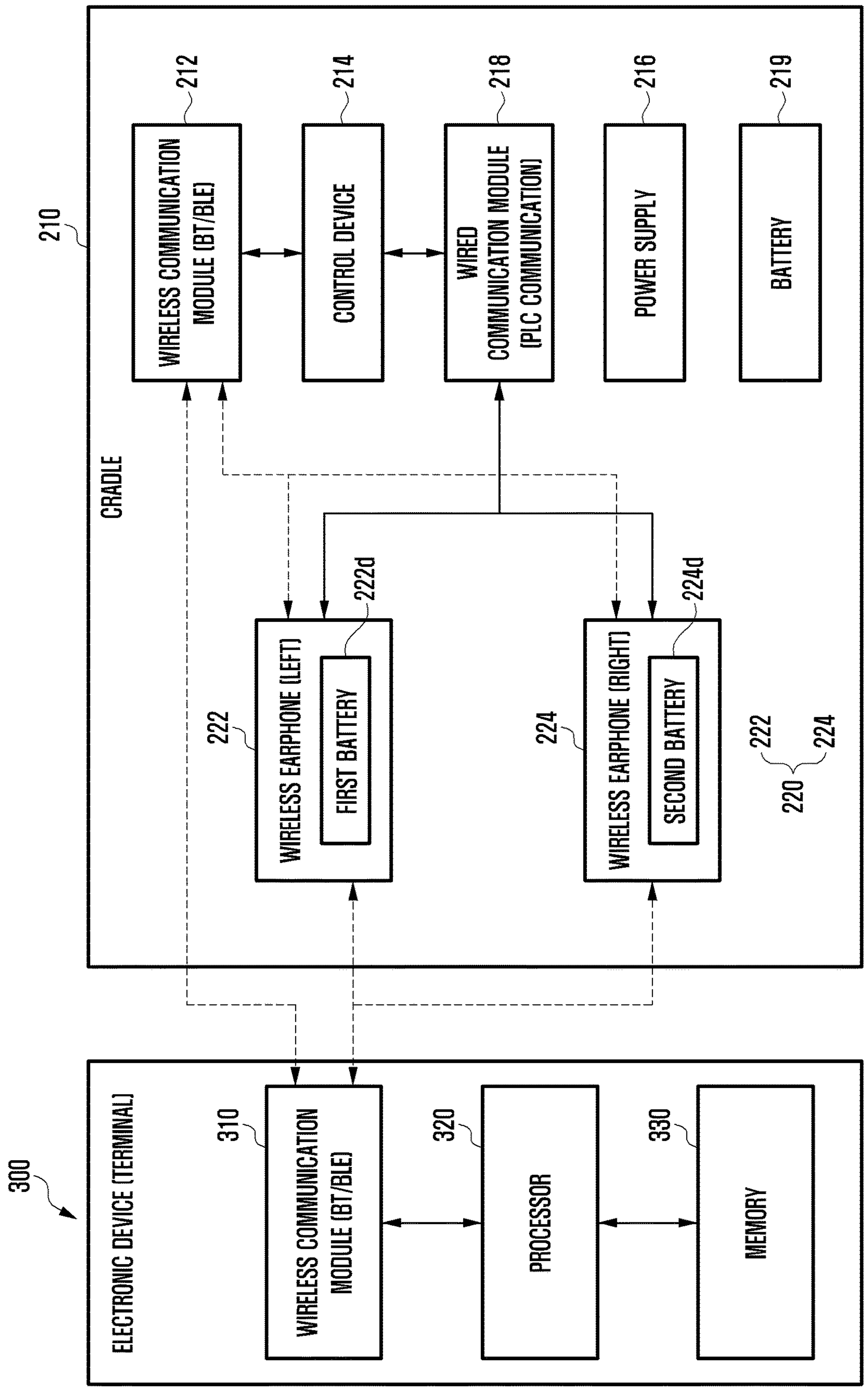
FIG. 3 is a diagram illustrating a connection between an electronic device including a wireless earphone and a cradle and a terminal.

As an embodiment, the first wireless earphone 222 and/or the second wireless earphone 224 are worn on the user's ear, and at the same time, sensing data (or sensing information) for wearing detection may be transmitted to the electronic devices 101 and 300 through Bluetooth communication with the electronic device (e.g., the electronic device 300 of FIG. 3 (e.g., a smartphone, a smart watch, a tablet PC, a notebook PC)). Whether the first wireless earphone 222 and/or the second wireless earphone 224 is worn on the user's ear may be sensed through the first sensor unit 222*i* of the first wireless earphone 222 and/or the second sensor unit of the second wireless earphone 224. The first processor 222*a* and/or the second processor may transmit the sensing result of whether the first wireless earphone 222 and/or the second wireless earphone 224 is worn on the user's ear to the cradle (e.g., the cradle 210 of FIG. 3) and/or the electronic devices 101 and 300 (e.g., the terminal).

As an embodiment, when the first wireless earphone 222 and/or the second wireless earphone 224 are located inside the cradle 210 (e.g., the first wireless earphone 222 and/or the second wireless earphone 224 is seated in the cradle 210), the first wireless earphone 222 and/or the second wireless earphone 224 may perform PLC communication with the cradle 210. For example, when PLC communication is successful between the first wireless earphone 222 and the second wireless earphone 224 and the wired communication module 218 (e.g., a PLC communication module), it may be determined that the first wireless earphone 222 and the second wireless earphone 224 are located (e.g., seated) in the cradle 210.

As an embodiment, when the first wireless earphone 222 succeeds in PLC communication with the wired communication module 218 (e.g., a PLC communication module) and the second wireless earphone 224 fails in PLC communication with the wired communication module 218 (e.g., PLC communication module), the first wireless earphone 222 may be determined to be located in the cradle 210 and the second wireless earphone 224 may be determined to be located outside the cradle 210.

As an embodiment, the second wireless earphone 224 succeeds in PLC communication with the wired communication module 218 (e.g., a PLC communication module), and the first wireless earphone 222 fails in PLC communication with the wired communication module 218 (e.g., a PLC communication module), the second wireless earphone 224 may be determined to be located in the cradle 210 and the first wireless earphone 222 may be determined to be located outside the cradle 210.

As an embodiment, when PLC communication fails between the first wireless earphone 222 and the second wireless earphone 224 and the wired communication module 218 (e.g., a PLC communication module), it may be determined that the first wireless earphone 222 and the second wireless earphone 224 are located outside the cradle 210.

As another example, the first wireless earphone 222 and/or the second wireless earphone 224 may be located in the cradle 210, so that power may be transferred to the first wireless earphone 222 through the first charging pin (e.g., the first charging pin 232 of FIG. 2A) (e.g., the first charging connector) of the cradle 210. Power may be transferred to the second wireless earphone 224 through the second charging pin (e.g., the second charging pin 234 of FIG. 2A) (e.g., the second charging connector) of the cradle 210. In this case, even if the control device 214 of the cradle 210 does not perform PLC communication with the first wireless earphone 222 and/or the second wireless earphone 224, it may be determined that the first wireless earphone 222 and/or the second wireless earphone 224 are located (e.g., seated) in the cradle 210.

As an embodiment, when the first wireless earphone 222 and/or the second wireless earphone 224 are paired with the electronic devices 101 and 300 (e.g., a terminal), the electronic devices 101 and 300 (e.g., a terminal) and the first wireless earphone 222 and/or the second wireless earphone 224 may transmit and receive data to and from each other.

As an embodiment, the first wireless earphone 222 and the second wireless earphone 224 may be charged (e.g., wired charging or wireless charging) in conjunction with the cradle 210 (e.g., a case) (e.g., a charging device). For example, the first wireless earphone 222 and/or the second wireless earphone 224 may perform a charging operation, based on power supplied from the cradle 210 when seated in the cradle 210.

As an embodiment, the first wireless earphone 222 and/or the second wireless earphone 224 may receive power transmitted from the power supply of the cradle 210 (e.g., the power supply 216 of FIG. 3), and may charge an internal battery (e.g., the first battery 222*d* of FIGS. 2D and 3, and the second battery 224*d* of FIG. 3), based on the applied power. For example, when the first wireless earphone 222 is disposed in the cradle 210, the first charging pins 232 (e.g., the first charging connector) of the cradles 210 may be electrically connected to the first charging terminal 2224 of the first wireless earphone 222, so that the first wireless earphone 222 may be charged. For example, when the second wireless earphone 224 is disposed in the cradle 210, the second charging pin 234 (e.g., the second charging connector) of the cradles 210 and the second charging terminal 2244 of the second wireless earphone 224 may be electrically connected to each other, so that the second wireless earphone 224 may be charged.

According to an embodiment, the first wireless earphone 222 and the second wireless earphone 224 may be accommodated (or mounted) in the cradle 210 or separated (or seceded) from the cradle 210 to the outside.

According to an embodiment, when the first wireless earphone 222 and/or the second wireless earphone 224 is detached from the cradle 210 to the outside, the power of the corresponding wireless earphone may be turned on.

As an embodiment, as shown in FIG. 2A, the housing 211 (or main body) of the cradle 210 may include a receiving portion 213 (or space) configured to accommodate (or store) the first wireless earphone 222 and/or the second wireless earphone 224.

As an embodiment, the receiving part 213 of the cradle 210 may be configured to maintain the seating state of the first wireless earphone 222 and the second wireless earphone 224 by magnetically drawing in the first wireless earphone 222 and the second wireless earphone 224 into the inside of the cradle 210.

As an embodiment, the receiving unit 213 may include a first charging pin 232 (e.g., a first charging connector) for charging the first wireless earphone 222.

As an embodiment, the receiving unit 213 may include a second charging pin 234 (e.g., a second charging connector) for charging the second wireless earphone 224.

As an embodiment, when the first wireless earphone 222 and/or the second wireless earphone 224 is mounted in the receiving part 213 of the cradle 210 and the cover of the housing 211 (or the main body) is closed, the power of the first wireless earphone 222 and/or the second wireless earphone 224 may be turned off. As another example, even if the cover of the housing 211 (or main body) is not closed, when the first wireless earphone 222 and/or the second wireless earphone 224 are mounted in the receiving part 213 of the cradle 210, power may be turned off.

According to an embodiment, when the first wireless earphone 222 and/or the second wireless earphone 224 are mounted in the cradle 210 and the cover of the housing 211 (or main body) is closed, the battery (e.g., the first battery 222*d* of FIGS. 2D and 3, and the second battery 224*d* of FIG. 3) may be charged. As another example, even if the cover of the housing 211 (or main body) is not closed, when the first wireless earphone 222 and/or the second wireless earphone 224 are mounted in the receiving part 213 of the cradle 210, the battery (e.g., the first battery 222*d* of FIG. 2D, FIG. 3, and the second battery 224*d* of FIG. 3) may be charged.

According to an embodiment, when the cover of the housing 211 (or the main body) is opened, the control device (e.g., the control device 214 of FIG. 3) may control the power of the first wireless earphone 222 and/or the second wireless earphone 224 to be turned on.

As an embodiment, the cradle 210 may include a plurality of acoustic reflection holes 242 and 244.

For example, the plurality of acoustic reflection holes 242 and 244 may include a first acoustic reflection hole 242 formed adjacent to the position where the first wireless earphone 222 is disposed, and a second acoustic reflection hole 244 formed adjacent to a position where the second wireless earphone 224 is disposed. For example, a protective structure (e.g., a metal mesh structure, a metal grill structure) for preventing being caught in the first acoustic reflection hole 242 and the second acoustic reflection hole 244 and for protecting the user's body from a sharp part may be disposed. For example, each of the first acoustic reflection hole 242 and the second acoustic reflection hole 244 may consist of one hole or a plurality of holes. For example, the first acoustic reflection hole 242 may be configured to output and/or amplify the location finding alarm output from the first wireless earphone 222 to the outside of the cradle 210.

For example, the second acoustic reflection hole 244 may be configured to output and/or record the location finding alarm output from the second wireless earphone 224 to the outside of the cradle 210.

As another embodiment, the cradle 210 may include a microphone capable of receiving (or inputting) a location finding alarm output from the first wireless earphone 222 and/or the second wireless earphone 224. The cradle 210 may include an audio output device (e.g., an amplification circuit and a speaker) capable of amplifying and outputting a location finding alarm received through a microphone. For example, the first acoustic reflection hole 242 may be configured to output and/or amplify a location finding alarm output from an audio output device (e.g., an amplifier circuit and a speaker) of the cradle 210 to the outside of the cradle 210. For example, the second acoustic reflection hole 244 may be configured to output and/or amplify a location finding alarm output from an audio output device (e.g., an amplifier circuit and a speaker) of the cradle 210 to the outside of the cradle 210.

FIG. 3 is a diagram illustrating a connection between an electronic device including a wireless earphone and a cradle and a terminal.

Referring to FIG. 2A and FIG. 3, the electronic device 300 (e.g., a terminal) (e.g., the electronic device 101 of FIG. 1) (e.g., a smartphone, a smart watch, a tablet PC, or a notebook PC) may include a wireless communication module 310 (e.g., the wireless communication module 192 of FIG. 1), a processor 320 (e.g., the processor 120 of FIG. 1), and a memory 330 (e.g., memory 130 of FIG. 1).

As an embodiment, the electronic device 300 (e.g., a terminal) may communicate with the plurality of wireless earphones 220 and/or the cradle 210 of the plurality of wireless earphones 220 through the wireless communication module 310 in Bluetooth and/or BLE method.

As an embodiment, the processor 320 may execute a program (e.g., application software for wireless earphone control) and/or instructions stored in the memory 330 to control the wireless communication module 310 and/or at least one other component (e.g., a hardware or software component) of the electronic device 300 (e.g., a terminal) connected to the processor 320. For example, the processor 320 may perform various data processing or operations, and may store commands or data received from other components of the electronic device 300 (e.g., the sensor module 176 and the wireless communication module 310) in the memory 330. The processor 320 may process the program, data, and/or instructions stored in the memory 330, and may store the processing result in the memory 330.

As an embodiment, a program and/or data for controlling the plurality of wireless earphones 220 may be stored in the memory 330. For example, the program stored in the memory 330 may include application software (e.g., a wearable application) for controlling the wireless earphone. For example, instructions for controlling the operation of the cradle 210 and/or the plurality of wireless earphones 220 may be stored in the memory 330.

According to an embodiment, the cradle 210 may include a wireless communication module 212, a control device 214, a power supply 216 for charging a plurality of wireless earphones 220, and a wired communication module 218 (e.g., a PLC communication module) for wired communication (e.g., PLC communication) with the plurality of wireless earphones 220. According to an embodiment, the cradle 210 may include at least one battery 219.

According to an embodiment, the cradle 210 may include a plurality of wireless earphones 220. When the plurality of wireless earphones 220 are located in the cradle 210, the plurality of wireless earphones 220 may be charged and PLC communication may be performed with the plurality of wireless earphones 220.

In some embodiments, the cradle 210 may include a coil for wireless charging. According to one embodiment, when the cradle 210 is supplied with direct current (DC) power from a travel adapter (TA) or a power supply, the cradle 210 may perform an operation of transmitting power to the plurality of wireless earphones 220 through the power supply 216 by converting DC power into alternating current (AC) power.

As an embodiment, the cradle 210 and the plurality of wireless earphones 220 may perform wired communication through a wired communication module 218 (e.g., a PLC communication module) in a wired communication (e.g., power line communication (PLC)) method. The cradle 210 and the plurality of wireless earphones 220 may communicate through wireless communication (e.g., Bluetooth and/or Bluetooth Low Energy (BLE)) via a wireless communication module 212 (e.g., a Bluetooth communication module and/or a BLE communication module). For example, PLC communication is to transmit data using a power line that supplies electricity, and when the first wireless earphone 222 and the second wireless earphone 224 are accommodated in the cradle 210, charging and PLC communication may be performed through the first charging pin 232 (e.g., a first charging connector) and the second charging pin 234 (e.g., a second charging connector). As another example, the cradle 210 may further include a separate pad for data communication in addition to the first charging pin 232 (e.g., a first charging connector) and the second charging pin 234 (e.g., a second charging connector).

As an embodiment, the cradle 210 and the electronic device 300 (e.g., a terminal) may communicate in the Bluetooth or Bluetooth low energy (BLE) method. For example, when the first wireless earphone 222 and/or the second wireless earphone 224 are located outside the cradle 210 (or the cover of the cradle 210 (the cover of the housing 211) is opened), the Bluetooth (or low-power Bluetooth) communication of the first wireless earphone 222 and/or the second wireless earphone 224 may be activated, and the first wireless earphone 222 and/or the second wireless earphone 224 may be paired with the electronic device 300 through Bluetooth communication.

According to an embodiment, the cradle 210 may include a housing 211 (e.g., the housing 211 of FIG. 2A). For example, the housing 211 may include a wireless communication module 212, a control device 214, a power supply 216, a wired communication module 218 (e.g., a PLC communication module), a battery 219, and a power interface.

As an embodiment, the cradle 210 may be connected to the electronic device 300 (e.g., a terminal) through Bluetooth and/or BLE communication through the wireless communication module 212.

As an embodiment, the electronic device 300 (e.g., a terminal) may control the operation of the cradle 210 using Bluetooth and/or BLE communication.

As an embodiment, the control device 214 of the cradle 210 may include a processor and a memory in which instructions for performing an operation of the processor are stored.

For example, the processor of the control device 214 may execute a program stored in the memory of the control device 214 to control the wireless communication module 212, the power supply unit 216, and/or the wired communication module 218 (e.g., a PLC communication module). In addition, the processor of the control device 214 may control at least one other component (e.g., a hardware or software component) of the cradle 210. For example, the processor of the control device 214 may control the power supply device 216 and the wired communication module 218 (e.g., a PLC communication module) to perform PLC communication with the plurality of wireless earphones 220. According to an embodiment, two or more of the power supply device 216, the wired communication module 218 (e.g., a PLC communication module), and the control device 214 may be integrated into one.

For example, the memory of the control device 214 may store a program and/or data for controlling the cradle 210 and/or the plurality of wireless earphones 220. For example, instructions for controlling the operation of the cradle 210 and/or the plurality of wireless earphones 220 may be stored in the memory of the control device 214. As an embodiment, the processor of the control device 214 may perform PLC communication with the first wireless earphone 222 through the wired communication module 218 (e.g., a PLC communication module). For example, the processor of the control device 214 may control the power supply unit 216 to apply power to the first wireless earphone 222 through the first charging pin 232 (e.g., the first charging connector). The cradle 210 may wake up the first wireless earphone 222 by applying power to the first wireless earphone 222.

As an embodiment, the processor of the control device 214 may perform PLC communication with the second wireless earphone 224 through the wired communication module 218 (e.g., a PLC communication module). For example, the processor of the control device 214 may control the power supply unit 216 to apply power to the second wireless earphone 224 through the second charging pin 234 (e.g., a second charging connector). The cradle 210 may wake up the second wireless earphone 224 by applying power to the second wireless earphone 224.

According to an embodiment, when the first wireless earphone 222 and the second wireless earphone 224 wake up, a wireless communication module (e.g., the first wireless communication circuit **222*f*** or the second wireless communication circuit) may be activated.

As an embodiment, after the first wireless earphone 222 and/or the second wireless earphone 224 wakes up, the electronic device 300 (e.g., a terminal) may perform a connection operation with the first wireless earphone 222 and/or the second wireless earphone 224 using the wireless communication module 212.

For example, when the electronic device 300 (e.g., a terminal) and the first wireless earphone 222 are connected through a wireless communication (e.g., Bluetooth or Bluetooth Low Energy (BLE)) method, the electronic device 300 (e.g., the terminal) may control the first wireless earphone 222 to output a location finding alarm for finding the location of the first wireless earphone 222. The first wireless earphone 222 may output a location finding alarm through a speaker under the control of the electronic device 300 (e.g., a terminal). The location finding alarm output from the first wireless earphone 222 may be output to the outside through the first acoustic reflection hole (e.g., the first acoustic reflection hole 242 of FIG. 2A) of the cradle 210. For example, when the first wireless earphone 222 is located in the cradle 210 or located outside the cradle 210 (excluding the state of being worn on the user's ear), the location finding alarm of the first wireless earphone 222 may be output at a volume greater than or equal to the first threshold. For example, the volume greater than or equal to the first threshold may include the maximum volume that the first wireless earphone 222 may output.

For example, when the first wireless earphone 222 is worn on the user's ear, the location finding alarm of the first wireless earphone 222 may be output at a volume less than or equal to the second threshold value. For example, the volume below the second threshold may include the minimum volume that the first wireless earphone 222 may output. As another example, when the first wireless earphone 222 is worn on the user's ear, the location finding alarm of the first wireless earphone 222 may not be output.

For example, when the electronic device 300 (e.g., a terminal) and the second wireless earphone 224 are connected through a wireless communication (e.g., Bluetooth or Bluetooth Low Energy (BLE)) method, the electronic device 300 (e.g., the terminal) may control the second wireless earphone 224 to output a location finding alarm for finding the location of the second wireless earphone 224. The second wireless earphone 224 may output a location finding alarm through a speaker under the control of the electronic device 300 (e.g., a terminal). The location finding alarm output from the second wireless earphone 224 may be output to the outside through the second acoustic reflection hole (e.g., the second acoustic reflection hole 244 of FIG. 2A) of the cradle 210. For example, when the second wireless earphone 224 is located in the cradle 210 or located outside the cradle 210 (excluding the state of being worn on the user's ear), the location finding alarm of the second wireless earphone 224 may be output at a volume greater than or equal to a first threshold (e.g., a volume greater than or equal to the first threshold may include the maximum volume).

For example, when the second wireless earphone 224 is worn on the user's ear, the location finding alarm of the second wireless earphone 224 may be output at a volume less than or equal to the second threshold value. For example, the volume less than or equal to the second threshold value may include the minimum volume that the second wireless earphone 224 may output. As another example, when the second wireless earphone 224 is worn on the user's ear, the location finding alarm of the second wireless earphone 224 may not be output.

As an embodiment, the electronic device 300 (e.g., a terminal) may configure the volume for outputting a location finding alarm of the first wireless earphone 222 and/or the second wireless earphone 224 depending on whether the user is wearing the first wireless earphone 222 and/or the second wireless earphone 224. The electronic device 300 (e.g., a terminal) may configure the volume of the first wireless earphone 222 and/or the second wireless earphone 224 to transmit a command to the first wireless earphone 222 and/or the second wireless earphone 224 to output a location finding alarm.

As another example, the electronic device 300 (e.g., a terminal) may configure the volume of the first wireless earphone 222 and/or the second wireless earphone 224 to transmit a command to the cradle 210 to output a sound or a location finding alarm. The cradle 210 that has received the command from the electronic device 300 (e.g., the terminal) may transmit the command to the first wireless earphone 222 and/or the second wireless earphone 224. The first wireless earphone 222 and/or the second wireless earphone 224 may output a sound or a location finding alarm at a volume based on a command received from the cradle 210.

As an embodiment, the first wireless earphone 222 and/or the second wireless earphone 224 may receive an output command of a location finding alarm from the electronic device 300 (e.g., a terminal). The first wireless earphone 222 and/or the second wireless earphone 224 may output a location finding alarm based on the received output command of the location finding alarm. In this case, the first wireless earphone 222 and/or the second wireless earphone 224 may configure the output volume of the location finding alarm according to whether the user is wearing or not wearing the earphone. The first wireless earphone 222 and/or the second wireless earphone 224 may output a location finding alarm with a configured volume.

As another embodiment, the first wireless earphone 222 may be located in the cradle 210, and the second wireless earphone 224 may be located outside the cradle 210, but the user may not wear the same. In this case, the electronic device 300 (e.g., the terminal) may control the first wireless earphone 222 to output a first alarm (e.g., a location finding alarm) at a volume greater than or equal to a first threshold (e.g., a volume greater than or equal to the first threshold may include the maximum volume). The electronic device 300 (e.g., the terminal) may control the second wireless earphone 224 to output a second alarm (e.g., a location finding alarm) at a volume greater than or equal to a first threshold (e.g., a volume greater than or equal to the first threshold may include the maximum volume). The first alarm (e.g., a location finding alarm) output from the first wireless earphone 222 and the second alarm (e.g., a location finding alarm) output from the second wireless earphone 224 may have different sounds. The first wireless earphone 222 and the second wireless earphone 224 may output different sound location finding alarms, so that the user may be able to recognize that the first wireless earphone 222 and the second wireless earphone 224 are located in different places. Through this, the user may easily find the location of the wireless earphones 222, 224.

As another embodiment, the first wireless earphone 222 may be located in the cradle 210 and the second wireless earphone 224 may be worn on the user's ear. In this case, the electronic device 300 (e.g., the terminal) may control the first wireless earphone 222 to output the first location finding alarm at a volume greater than or equal to a first threshold (e.g., a volume greater than or equal to the first threshold may include the maximum volume). The electronic device 300 (e.g., the terminal) may cause the second wireless earphone 224 to output the second location finding alarm at a volume equal to or lower than the second threshold (e.g., the volume equal to or lower than the second threshold may include the minimum volume). When the second wireless earphone 224 is worn on the user's ear, the electronic device 300 (e.g., a terminal) may control the second wireless earphone 224 not to output the second location finding alarm.

As another embodiment, the first wireless earphone 222 may be located in the cradle 210, and the second wireless earphone 224 may be located outside the cradle 210 (e.g., not worn on the user's ear). In this case, the electronic device 300 (e.g., the terminal) may command the output of the location finding alarm to the first wireless earphone 222 and/or the second wireless earphone 224. In this case, the volume of the location finding alarm may be controlled by the first wireless earphone 222 and/or the second wireless earphone 224. The first wireless earphone 222 may output the first location finding alarm at a volume greater than or equal to a first threshold (e.g., a volume greater than or equal to the first threshold may include the maximum volume). The second wireless earphone 224 may output the second location finding alarm at a volume equal to or lower than the second threshold (e.g., the volume below the second threshold may include the minimum volume).

As another example, when the first wireless earphone 222 is worn on the user's ear, the location finding alarm of the first wireless earphone 222 may be output at a volume below the second threshold (e.g., the volume below the second threshold may include the minimum volume) or the location finding alarm may not be output. The volume of the location finding alarm of the first wireless earphone 222 may be controlled by the electronic device 300 (e.g., a terminal) or may be controlled by the first wireless earphone 222.

As another example, when the second wireless earphone 224 is worn on the user's ear, the location finding alarm of the second wireless earphone 224 may be output at a volume equal to or lower than the second threshold (e.g., the volume below the second threshold may include the minimum volume) or the location finding alarm may not be output. The volume of the location finding alarm of the second wireless earphone 224 may be controlled by the electronic device 300 (e.g., a terminal) or may be controlled by the second wireless earphone 224.

As an embodiment, the control device 214 of the cradle 210 may transmit a signal related to the location finding alarm output to the first wireless earphone 222 using the first charging pin 232 (e.g., the first charging connector). The first wireless earphone 222 may receive a signal related to the output of the location finding alarm and output the location finding alarm through the speaker. As an embodiment, the control device 214 of the cradle 210 may transmit a signal related to the output of the location finding alarm to the second wireless earphone 224 using the second charging pin 234 (e.g., the second charging connector). The second wireless earphone 224 may receive a signal related to the output of the location finding alarm and output the location finding alarm through the speaker. As an embodiment, the cradle 210 and the first wireless earphone 222 and/or the second wireless earphone 224 may receive a signal related to the output of the location finding alarm through wired communication (e.g., PLC communication) without the operation of waking up the first wireless earphone 222 and/or the second wireless earphone 224. The first wireless earphone 222 and/or the second wireless earphone 224 may output a location finding alarm through a speaker.

The cradle 210 according to various embodiments of the present disclosure may output a location finding alarm from the first wireless earphone 222 and/or the second wireless earphone 224 through communication with the electronic device 300 (e.g., a terminal). The cradle 210 according to various embodiments of the present disclosure may cause the location finding alarm to be output from the first wireless earphone 222 and/or the second wireless earphone 224 through communication with the first wireless earphone 222 and/or the second wireless earphone 224 and allow a user to easily locate the wireless earphones 222 and 224.

As an embodiment, when the first wireless earphone 222 and/or the second wireless earphone 224 are located (e.g., seated) in the cradle 210, the electronic device 300 (e.g., a terminal) may transmit an output command of the location finding alarm to the control device 214 of the cradle 210. The control device 214 of the cradle 210 may control the wired communication module 218 (e.g., a PLC communication module) to transmit an output command of the location finding alarm to the first wireless earphone 222 and/or the second wireless earphone 224 via PLC communication. The first wireless earphone 222 and/or the second wireless earphone 224 that has received the output command of the location finding alarm may output the location finding alarm.

As an embodiment, when the electronic device 300 and the first wireless earphone 222 and/or the second wireless earphone 224 are in a wireless communication connection state, the electronic device 300 (e.g., a terminal) may transmit an output command of the location finding alarm to the first wireless earphone 222 and/or the second wireless earphone 224. The first wireless earphone 222 and/or the second wireless earphone 224 that has received the output command of the location finding alarm may output the location finding alarm.

As an embodiment, one of the first wireless earphone 222 and the second wireless earphone 224 (e.g., the first wireless earphone 222) is located in the cradle 210 in the cradle 210 (e.g., seated), and the other (e.g., the second wireless earphone 224) is in a state of wireless communication connection with the electronic device 300, the electronic device 300 may transmit an output command of the location finding alarm to the control device 214 of the cradle 210. The control device 214 of the cradle 210 may control the wired communication module 218 (e.g., a PLC communication module) to transmit an output command of the location finding alarm to the wireless earphone (e.g., the first wireless earphone 222) located in the cradle 210 through PLC communication. In addition, the electronic device 300 may transmit an output command of the location finding alarm to a wireless earphone (e.g., the second wireless earphone 224) connected to wireless communication. The first wireless earphone 222 and/or the second wireless earphone 224 that has received the output command of the location finding alarm may output the location finding alarm.

As an embodiment, the cradle 210 may include an audio output device (e.g., an amplifier circuit and a speaker). When an output command of the location finding alarm is received from the electronic device 300, the location finding alarm may be output through the audio output device of the cradle 210. In this case, when the output command of the location finding alarm is also transmitted to the first wireless earphone 222 and/or the second wireless earphone 224, the first wireless earphone 222 and/or the second wireless earphone 224 may also output a location finding alarm.

In the electronic device according to various embodiments of the present disclosure, a wireless communication module 212 (e.g., a Bluetooth low energy (BLE) communication module) embedded in the cradle 210 and the electronic device 300 (e.g., a terminal) are connected, it is possible to perform a remote control implementation function to periodically check the state of the wireless earphones 222 and 224 (e.g., the charging state of the batteries **222*d* and 224*d* of the wireless earphone, the charging state of the battery 219 of the cradle 210). Through this, the charging state of the batteries 222*d* and 224*d* of the wireless earphones 222 and 224 and the charging state of the battery 219 of the cradle 210** may be identified, so that the batteries need to be charged before the batteries are discharged.

The electronic device 300 according to various embodiments of the present disclosure may provide information such as a pop-up message to the user to prevent loss of the wireless earphones 222 and 224 using the Bluetooth or BLE connection state or not to forget the wireless earphones 222 and 224 when going out (e.g., may be displayed) through the program 320 (e.g., application software for wireless earphone control) built in the electronic device 300 (e.g., terminal).

Figure 4A:
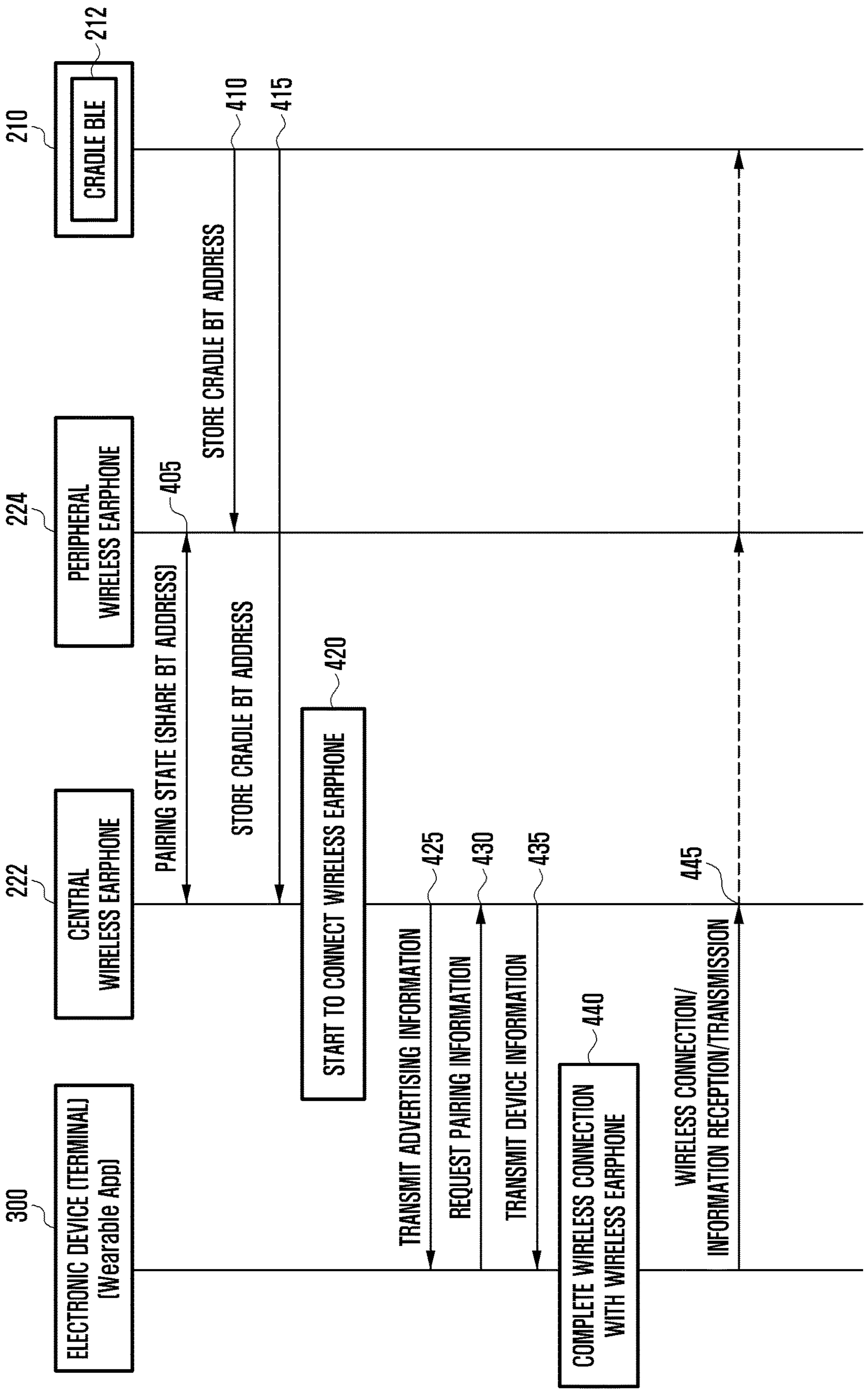
FIG. 4A is a diagram illustrating an initial connection method between an electronic device including a wireless earphone and a cradle and a terminal.

FIG. 4A is a diagram illustrating an initial connection method between an electronic device including a wireless earphone and a cradle and a terminal.

Referring to FIGS. 3 and 4A, a user may connect the electronic device 300 (e.g., a terminal) and the wireless earphones 222 and 224 in a wireless communication (e.g., Bluetooth or low-power Bluetooth (BLE)) method to perform a function of finding the location of the wireless earphones 222 and 224.

In operation 405, the first wireless earphone 222 (e.g., central (primary, or main) wireless earphone) and the second wireless earphone 224 (e.g., peripheral (or secondary) wireless earphone) may check the pairing status. In this case, the first wireless earphone 222 and the second wireless earphone 224 may be connected through Bluetooth or BLE communication, and may share a Bluetooth address with each other.

In operations 410 and 415, a cradle (e.g., the cradle 210 of FIG. 3) may provide the Bluetooth address of the cradle 210 to the first wireless earphone 222 and the second wireless earphone 224 using the wireless communication module 212 (e.g., BLE communication module). The first wireless earphone 222 and the second wireless earphone 224 may store the Bluetooth address of the cradle 210. The first wireless earphone 222 and the second wireless earphone 224 may share a Bluetooth address of the cradle 210. For example, Bluetooth address data may be stored in the memory of the control device 214 of the cradle 210. The cradle 210 may read the Bluetooth address stored in the memory of the control device 214 and provide the Bluetooth address to the first wireless earphone 222 and the second wireless earphone 224. For example, the cradle 210 may provide the Bluetooth address to the first wireless earphone 222 and the second wireless earphone 224 through PLC communication. For example, the cradle 210 may be connected to the first wireless earphone 222 and the second wireless earphone 224 using the Bluetooth address. For example, the cradle 210 may be connected to the electronic device 300 or another electronic device using the Bluetooth address.

In operation 420, it may be checked whether the electronic device 300 (e.g., a terminal) is connected to the first wireless earphone 222 and/or the second wireless earphone 224. When the electronic device 300 (e.g., the terminal) and the first wireless earphone 222 and/or the second wireless earphone 224 are not connected, a connection between the electronic device 300 (e.g., a terminal) and the first wireless earphone 222 and/or the second wireless earphone 224 may be performed.

In operation 425, the first wireless earphone 222 (e.g., a central (or, primary, or main) wireless earphone) may transmit advertisement information for connection with the electronic device 300 (e.g., a terminal) to the electronic device 300 (e.g., a terminal).

In operation 430, the electronic device 300 (e.g., a terminal) may transmit the pairing information request to the first wireless earphone 222 (e.g., a central (primary, or main) wireless earphone).

In operation 435, the first wireless earphone 222 (e.g., a central (or, primary, or main) wireless earphone) may transmit device information to the electronic device 300 (e.g., a terminal).

In operation 440, the electronic device 300 (e.g., a terminal) may complete wireless (e.g., Bluetooth, BLE) connection with the wireless earphones 222 and 224.

In operation 445, the electronic device 300 (e.g., a terminal) may be connected to the first wireless earphone 222 (e.g., a central (or primary, or main) wireless earphone), the second wireless earphone 224 (e.g., a peripheral (or secondary) wireless earphone), and/or the cradle 210 through Bluetooth communication and transmit/receive information.

As an embodiment, the Bluetooth address obtained by the first wireless earphone 222 and/or the second wireless earphone 224 in operations 410 and 415 may be transmitted to the electronic device 300 (e.g., a terminal).

As an embodiment, the cradle 210 may transmit a Bluetooth address to the electronic device 300 (e.g., a terminal) regardless of the wireless connection between the electronic device 300 (e.g., a terminal) and the first wireless earphone 222 and/or the second wireless earphone 224.

As an embodiment, the electronic device 300 (e.g., a terminal) may transmit the audio output of the wireless earphones 222 and 224, configuration information for the operation of the wireless earphones 222 and 224 to the cradle, and/or the wireless earphones 222 and 224.

As an embodiment, when necessary, the user may be connected to the first wireless earphone 222 (e.g., a central (or, primary, or main) wireless earphone) through the electronic device 300 (e.g., a terminal) via Bluetooth communication. For example, the electronic device 300 (e.g., terminal) may control the control device 214 of the cradle 210 to control the operation of the first wireless earphone 222 (e.g., a central (or, primary, or main) wireless earphone).

As an embodiment, when necessary, the user may be connected to the second wireless earphone 224 (e.g., a peripheral (or secondary) wireless earphone) through the electronic device 300 (e.g., a terminal) via Bluetooth communication. For example, the electronic device 300 (e.g., a terminal) may control the control device 214 of the cradle 210 to control the operation of the second wireless earphone 224 (e.g., a peripheral (or secondary) wireless earphone).

As an embodiment, when necessary, the user may connect to the wireless communication module 212 (e.g., BLE communication module) of the cradle 210 through Bluetooth communication through the electronic device 300 (e.g., a terminal). For example, the electronic device 300 (e.g., a terminal) may control the operation of the control device 214 of the cradle 210.

As an embodiment, each of the first wireless earphone 222 and the second wireless earphone 224 is communicatively connected to the electronic device 300 (e.g., a terminal), and both the first wireless earphone 222 and the second wireless earphone 224 may receive an audio packet from the electronic device 300 (e.g., a terminal).

As an embodiment, the electronic device 300 (e.g., a terminal) may control the first wireless earphone 222, the second wireless earphone 224, and the wireless communication module 212 to receive all data (e.g., an audio packet). For example, when the electronic device 300 (e.g., a terminal) transmits an audio packet using the sniffing technology, the first wireless earphone 222, the second wireless earphone 224, and the wireless communication module 212 may receive all of the audio packets.

As an embodiment, the electronic device 300 (e.g., a terminal) and the first wireless earphone 222 (e.g., a central (or a primary or main) wireless earphone) are communicated and connected, and the second wireless earphone 224 (e.g., peripheral (or secondary) wireless earphone) may connect communication by sniffing a communication connection between an electronic device 300 (e.g., a terminal) and a first wireless earphone 222 (e.g., a primary) or a main wireless earphone).

According to various embodiments, the first wireless earphone 222 and the second wireless earphone 224 may be connected (e.g., a 1:N communication connection) to other electronic devices in addition to the electronic device 300 (e.g., a terminal).

Figure 4B:
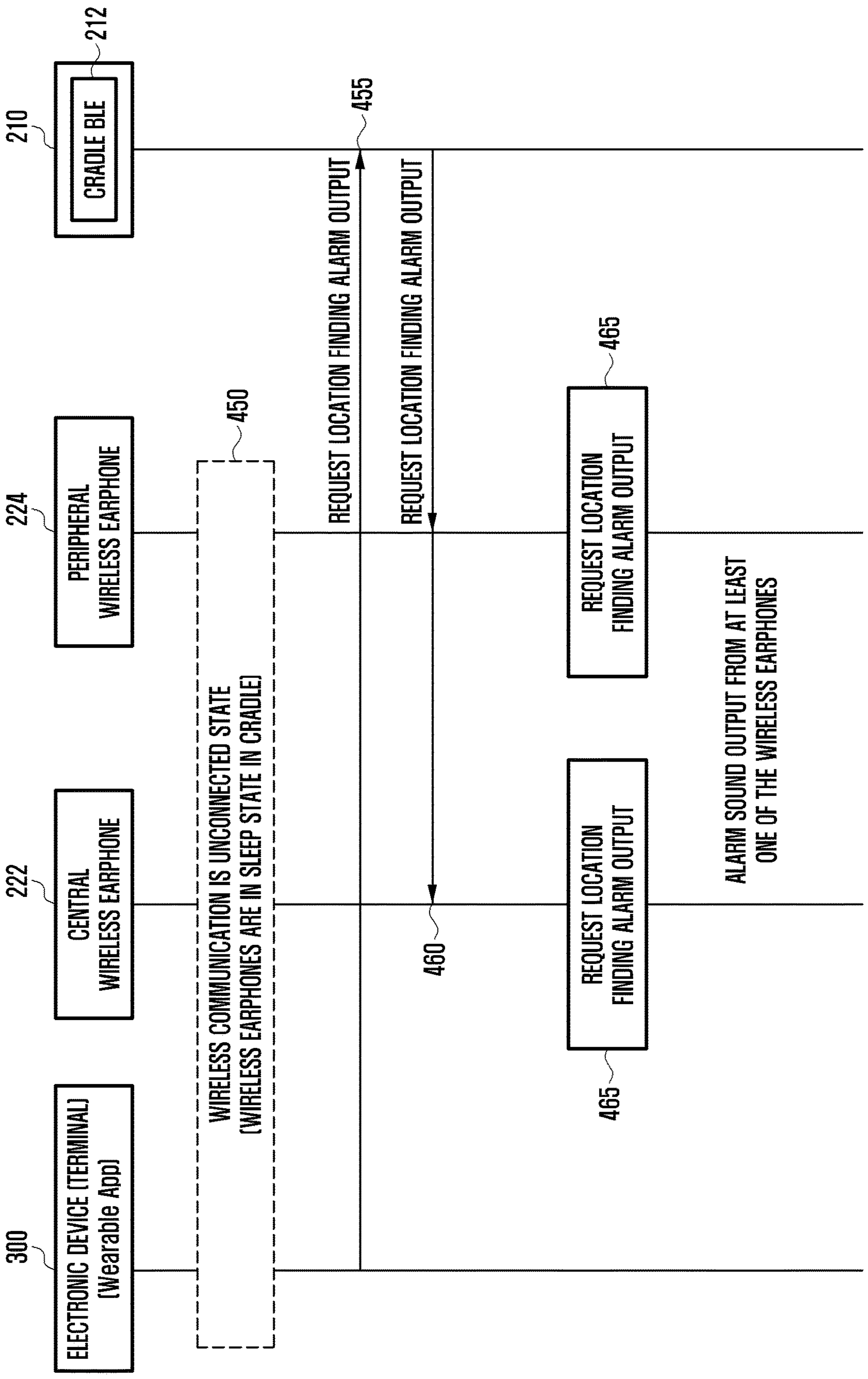
FIG. 4B is a diagram illustrating a method of operating an electronic device (e.g., a terminal), a cradle, and a wireless earphone for outputting a location finding alarm.

FIG. 4B is a diagram illustrating a method of operating an electronic device (e.g., a terminal), a cradle, and a wireless earphone for outputting a location finding alarm.

Referring to FIG. 4B, as an embodiment, in operation 450, wireless communication between the electronic device 300 (e.g., a terminal) and the wireless earphones 222 and 224 may not be connected. For example, the wireless earphones 222 and 224 may be located in the cradle 210 and may be in a sleep state, and wireless communication between the wireless earphones 222 and 224 and the electronic device 300 may not be connected.

As an embodiment, the cradle 210 may determine whether the first wireless earphone 222 (e.g., central (or primary or main) wireless earphone) and the second wireless earphone 224 (e.g., peripheral (or secondary) wireless earphone) are located inside or outside the cradle 210 through wired communication (E.G., PLC communication) with the first wireless earphone 222 (e.g., central (or, primary or main) wireless earphone) and the second wireless earphone 224 (e.g., peripheral (or secondary) wireless earphone)

As an embodiment, when the wired communication (e.g., PLC communication) with the first wireless earphone 222 (e.g., central (or primary, or main) wireless earphone) is successful, the cradle 210 may determine that the first wireless earphone 222 (e.g., central (or primary, or main) wireless earphone) is located inside the cradle 210. As an embodiment, when the wired communication (e.g., PLC communication) with a second wireless earphone (224) (e.g., peripheral (or secondary) wireless earphone) is successful, the cradle 210 may determine that a second wireless earphone 224 (e.g., peripheral (or secondary) wireless earphone) is located inside the cradle 210.

As an embodiment, when the wired communication (e.g., PLC communication) with the first wireless earphone 222 (e.g., central (or primary, or main) wireless earphone) is not successful, the cradle 210 may determine that the first wireless earphone 222 (e.g., central (or primary, or main) wireless earphone) is located outside the cradle 210. As an embodiment, when the wired communication (e.g., PLC communication) with the second wireless earphone (224) (e.g., peripheral) (e.g., secondary) wireless earphone) is not successful, the cradle (210) may determine that the second wireless earphone 224 (e.g., a peripheral (or secondary) wireless earphone) is located outside the cradle 210.

In operation 455, the electronic device 300 (e.g., the terminal) may transmit a location finding alarm output request to the cradle 210 so that the location finding alarm is output from the wireless earphones 222 and 224. According to an embodiment, when the electronic device 300 receives information from the cradle 210 that the first wireless earphone 222 and/or the second wireless earphone 224 is located inside the cradle 210, the electronic device 300 may transmit a location finding alarm output request to the cradle 210. According to an embodiment, the electronic device 300 may transmit a location finding alarm output request to the cradle 210 when wireless communication with the first wireless earphone 222 and the second wireless earphone 224 is not connected. For example, the electronic device 300 may store information (e.g., a Bluetooth address) about the cradle 210 for charging and/or storage of the first wireless earphone 222 and the second wireless earphone 224, and may transmit a location finding alarm output request to the cradle 210 based on a request from the user.

In operation 460, the cradle 210 may receive a location search alarm request of the wireless earphones 222 and 224 from the electronic device 300 (e.g., a terminal). The cradle 210 may transmit a location finding alarm request of the wireless earphones 222 and 224 to the wireless earphones 222 and 224

In operation 465, the first wireless earphone 222 and/or the second wireless earphone 224 may receive a location finding alarm request from the cradle 210. At least one of the first wireless earphone 222 and the second wireless earphone 224 may output a location search alarm based on the received location search alarm request.

As an embodiment, when the first wireless earphone 222 is located inside the cradle 210, the location finding alarm of the first wireless earphone 222 may be output at a volume greater than or equal to a first threshold (e.g., a volume greater than or equal to the first threshold may include the maximum volume). As an embodiment, when the second wireless earphone 224 is located inside the cradle 210, the location finding alarm of the second wireless earphone 224 may be output at a volume greater than or equal to a first threshold (e.g., a volume greater than or equal to the first threshold may include the maximum volume).

As an embodiment, the location finding alarm output from the first wireless earphone 222 may be output to the outside through the first acoustic reflection hole (e.g., the first acoustic reflection hole 242 of FIG. 2A) of the cradle 210. As an embodiment, the location finding alarm output from the second wireless earphone 224 may be output to the outside through the second acoustic reflection hole (e.g., the second acoustic reflection hole 244 of FIG. 2A) of the cradle 210.

At least some of the operations illustrated in FIGS. 4A and 4B may be omitted. At least some operations mentioned with reference to other drawings in this document may be added and/or inserted before or after at least some operations illustrated in FIGS. 4A and 4B. All or some of the operations illustrated in FIGS. 4A and 4B may be performed by a processor (e.g., the processor 120 of FIG. 1 and the processor 320 of FIG. 3) of the electronic device 300. All or some of the operations shown in FIGS. 4A and 4B may be performed by the control device 214 of the cradle 210. All or some of the operations shown in FIGS. 4A and 4B may be performed by the wireless earphones 222 and 224. For example, the memory (e.g., the memory 130 of FIG. 1, the memory 330 of FIG. 3) of the electronic device 300 may store instructions that, when executed, cause a processor (e.g., processor 120 of FIG. 1, processor 320 of FIG. 3) to perform all or some of the operations illustrated in FIGS. 4A and 4B. For example, the memory included in the control device 214 of the cradle 210 may store instructions that, when executed, cause the control device 214 to perform all or some of the operations shown in FIGS. 4A and 4B. For example, the first memory of the first wireless earphone 222 (e.g., the first memory 222*h* of FIG. 2D) and/or the second memory of the second wireless earphone 224 may store instructions that, when executed, cause the first processor (e.g., the first processor 222*a* in FIG. 2D) and/or the second processor to perform all or some of the operations illustrated in FIGS. 4A and 4B.

FIG. 5 is a diagram illustrating a method of operating an electronic device according to positions of wireless earphones.

Referring to FIGS. 2A and 5, various operations for finding the location of the wireless earphones 222 and 224 may be performed according to the positions of the first wireless earphones 222 and the second wireless earphones 224.

As an embodiment, when both the first wireless earphone 222 and the second wireless earphone 224 are located (e.g., seated) inside the cradle 210, the location finding operation of the wireless earphones 222 and 224 may be performed.

As an embodiment, when both the first wireless earphone 222 and the second wireless earphone 224 are worn on the user's ear, a location finding operation of the wireless earphones 222 and 224 may be performed.

As an embodiment, when both the first wireless earphone 222 and the second wireless earphone 224 are located outside the cradle 210 (not worn on the user's ear), a location finding operation of the wireless earphones 222 and 224 may be performed.

As an embodiment, when the first wireless earphone 222 is worn on the user's ear and the second wireless earphone 224 is located (e.g., seated) inside the cradle 210, a location finding operation of the wireless earphones 222 and 224 may be performed.

As an embodiment, when the first wireless earphone 222 is located inside (e.g., seated) of the cradle 210, and the second wireless earphone 224 is located outside the cradle 210 (not worn on the user's ear), a location finding operation of the wireless earphones 222 and 224 may be performed.

As an embodiment, when the first wireless earphone 222 is worn on the user's ear and the second wireless earphone 224 is located outside the cradle 210 (not worn on the user's ear), a location finding operation of the wireless earphones 222 and 224 may be performed.

As an embodiment, when the first wireless earphone 222 is located (e.g., seated) inside the cradle 210 and the second wireless earphone 224 is worn on the user's ear, a location finding operation of the wireless earphones 222 and 224 may be performed.

As an embodiment, when the first wireless earphone 222 is located outside the cradle 210 (not worn on the user's ear), and the second wireless earphone 224 is located (e.g., seated) inside the cradle 210, a location finding operation of the wireless earphones 222 and 224 may be performed.

As an embodiment, when the first wireless earphone 222 is located outside the cradle 210 (not worn on the user's ear) and the second wireless earphone 224 is worn on the user's ear, a location finding operation of the wireless earphones 222 and 224 may be performed.

Figure 6:
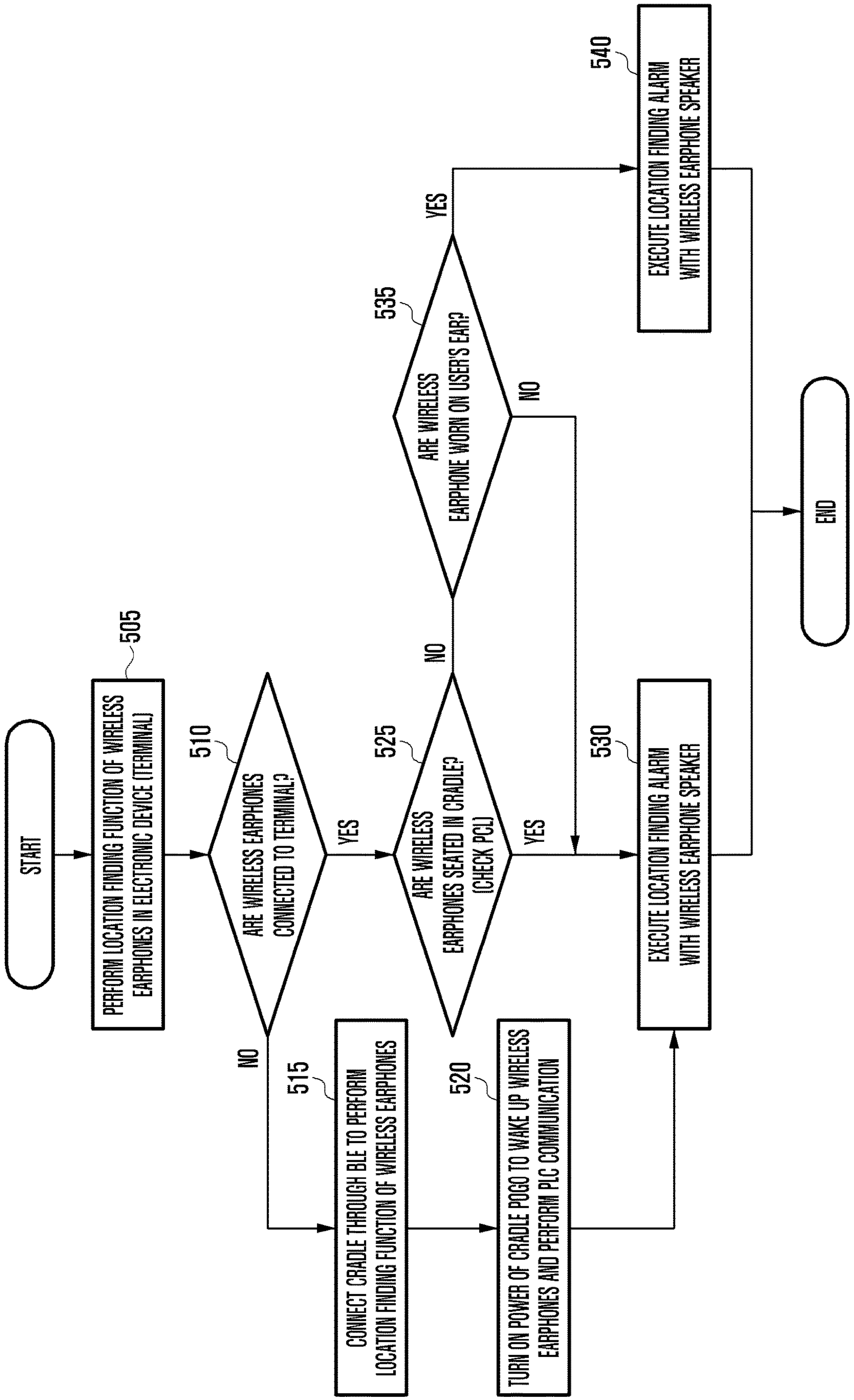
FIG. 6 is a diagram illustrating a method of operating an electronic device according to embodiments of the present disclosure.

FIG. 6 is a diagram illustrating a method of operating an electronic device according to embodiments of the present disclosure.

Referring to FIGS. 3, 5, and 6, in operation 505, the electronic device 300 (e.g., a terminal) may perform a location finding function of the wireless earphones 222 and 224. For example, the electronic device 300 (e.g., a terminal) may perform a function to find the location of the wireless earphones 222 and 224 based on a user's input.

In operation 510, the electronic device 300 (e.g., a terminal) may determine whether the wireless earphones 222 and 224 are connected to each other through wireless communication (e.g., Bluetooth or Bluetooth Low Energy (BLE)).

As a result of the determination in operation 510, when the electronic device 300 (e.g., a terminal) and the wireless earphones 222 and 224 are not connected through a wireless communication (e.g., Bluetooth or Bluetooth low energy (BLE)) method, the electronic device 300 (e.g., a terminal) may determine that the wireless earphones 222 and 224 are located (e.g., seated) inside the cradle 210. For example, when the PLC communication between the cradle 210 and the wireless earphones 222 and 224 is successful, the electronic device 300 (e.g., the terminal) may determine that the wireless earphones 222 and 224 are located (e.g., seated) inside the cradle 210.

In operation 515, the electronic device 300 (e.g., a terminal) may connect the cradle 210 through BLE communication to perform a location finding function of the wireless earphones 222 and 224. For example, the electronic device 300 (e.g., a terminal) may connect to the wireless communication module 212 of the cradle 210 through BLE communication in order to check whether the wireless earphones 222, 224 are in sleep mode (or power off mode) inside the cradle 210. The electronic device 300 (e.g., a terminal) may perform a location finding function of the wireless earphones 222 and 224 by connecting to the cradle 210 through BLE communication.

In operation 520, the cradle 210 may turn on the power of the first charging pin (e.g., the first charging pin 232 of FIG. 2A) of the cradle 210 (e.g., a first charging connector) and/or a second charging pin (e.g., the second charging pin 234 of FIG. 2A) to wake up the wireless earphones 222 and 224. Thereafter, the cradle 210 may perform PLC communication with the wireless earphones 222 and 224. For example, the cradle 210 may transmit a wireless earphone search operation command to the wireless earphones 222 and 224 through PLC communication.

According to an embodiment, the wireless earphones 222 and 224 that have received the wireless earphone search operation command from the cradle 210 may output a location finding alarm at a volume greater than or equal to a first threshold (e.g., a volume greater than or equal to the first threshold may include a maximum volume).

According to an embodiment, the electronic device 300 (e.g., a terminal) is not connected to the wireless earphones 222 and 224 in a wireless communication (e.g., Bluetooth or Bluetooth Low Energy (BLE)) method, and the wireless earphones (222, 224) are not located (e.g., seated) inside the cradle (210), the electronic device 300 (e.g., a terminal) may determine that the wireless earphones 222 and 224 are out of a range capable of wireless communication (e.g., Bluetooth or low energy Bluetooth (BLE)) or that the power of the wireless earphones 222 and 224 is turned off. In this case, the electronic device 300 (e.g., a terminal) may provide (e.g., display) status information (e.g., out of a communication range or power off) of the wireless earphones 222 and 224 to the user.

As a result of the determination in operation 510, when the electronic device 300 (e.g., the terminal) and the wireless earphones 222 and 224 are connected by a wireless communication (e.g., Bluetooth or Bluetooth Low Energy (BLE)) method, in operation 525, it may be determined whether the wireless earphones 222 and 224 are seated inside the cradle 210. For example, when the wireless earphones 222 and 224 are located (e.g., seated) inside the cradle 210 and the cover of the cradle 210 (e.g., the cover of the housing 211) is open, the electronic device 300 and the wireless earphones 222 and 224 may be connected through wireless communication (e.g., Bluetooth or Bluetooth Low Energy (BLE)). At this time, in order to check the state of the wireless earphones 222 and 224, the electronic device 300 (e.g., a terminal) may determine whether the wireless earphones 222 and 224 are located (e.g., seated) inside the cradle 210 through PLC communication. For example, when PLC communication between the cradle 210 and the wireless earphones 222 and 224 is normally confirmed, the electronic device 300 (e.g., a terminal) may determine that the wireless earphones 222 and 224 are located (e.g., seated) inside the cradle 210.

As a result of the determination in operation 525, when the wireless earphones 222 and 224 are located (e.g., seated) inside the cradle 210, in operation 530, the electronic device 300 (e.g., the terminal) may transmit an output command of the location finding alarm to the cradle 210 and/or the wireless earphones 222 and 224.

As an embodiment, when the wireless earphones 222 and 224 are located inside the cradle 210 and are in a sleep state, the electronic device 300 (e.g., a terminal) may transmit an output command of the location finding alarm to the cradle 210. After receiving the output command of the location finding alarm from the electronic device 300 (e.g., the terminal), the cradle 210 may transmit the output command of the location finding alarm to the wireless earphones 222 and 224 through PLC communication.

As another embodiment, when the wireless earphones 222 and 224 are located inside the cradle 210, but are connected to the electronic device 300 (e.g., a terminal) by wireless communication (e.g., Bluetooth or Bluetooth low energy (BLE)), the electronic device 300 (e.g., the terminal) may transmit an output command of the location finding alarm to the wireless earphones 222 and 2224. The wireless earphones 222 and 224 may receive the command to output a location finding alarm from the electronic device 300 (e.g., a terminal) through wireless communication (e.g., Bluetooth or Bluetooth low energy (BLE)).

As another embodiment, when the wireless earphones 222 and 224 are located inside the cradle 210, but are connected to the electronic device 300 (e.g., a terminal) by wireless communication (e.g., Bluetooth or Bluetooth low energy (BLE)), the electronic device 300 (e.g., the terminal) may transmit an output command of the location finding alarm to the cradle 210. After receiving the output command of the location finding alarm from the electronic device 300 (e.g., the terminal), the cradle 210 may transmit the output command of the location finding alarm to the wireless earphones 222 and 224 through PLC communication.

As an embodiment, the first wireless earphone 222 that has received the output command of the location finding alarm may output the location finding alarm through the speaker. For example, the location finding alarm of the first wireless earphone 222 may be output at a volume greater than or equal to a first threshold (e.g., a volume greater than or equal to the first threshold may include the maximum volume).

As an embodiment, the second wireless earphone 224 that has received the output command of the location finding alarm may output the location finding alarm through the speaker. For example, the location finding alarm of the second wireless earphone 224 may be output at a volume greater than or equal to a first threshold (e.g., a volume greater than or equal to the first threshold may include the maximum volume). For example, the volume level of the location finding alarm of the first wireless earphone 222 may be configured in the electronic device 300 (e.g., the terminal), may be configured in the cradle 210, or may be configured in the first wireless earphone 222. For example, the volume level of the location finding alarm of the second wireless earphone 224 may be configured in the electronic device 300 (e.g., the terminal), may be configured in the cradle 210, or may be configured in the second wireless earphone 224.

As an embodiment, the location finding alarm output from the first wireless earphone 222 may be output to the outside through the first acoustic reflection hole (e.g., the first acoustic reflection hole 242 of FIG. 2A) of the cradle 210. The location finding alarm output from the second wireless earphone 224 may be output to the outside through the second acoustic reflection hole (e.g., the second acoustic reflection hole 244 of FIG. 2A) of the cradle 210.

As a result of the determination in operation 525, when the wireless earphones 222 and 224 are not located inside the cradle 210, in operation 535, it may be determined whether the wireless earphones 222 and 224 are worn on the user's ear. For example, the first wireless earphone 222 may sense whether the first wireless earphone 222 is worn on the user's ear through a first wear detection sensor (e.g., the first wear detection sensor 2223 of FIG. 2B). The second wireless earphone 224 may sense whether the second wireless earphone 224 is worn on the user's ear through a second wear detection sensor (e.g., the second wear detection sensor 2243 of FIG. 2C). The first wireless earphone 222 and the second wireless earphone 224 may provide a result of determining whether they are worn on the user's ear to the cradle 210 and/or the electronic device 300 (e.g., the terminal). For example, the first wireless earphone 222 and the second wireless earphone 224 may transmit the determination result of whether the first wireless earphone 222 and the second wireless earphone 224 are worn on the user's ear to the cradle 210. The cradle 210 may transmit a result of determining whether the first wireless earphone 222 and the second wireless earphone 224 are worn on the user's ear to the electronic device 300 (e.g., the terminal). For example, the first wireless earphone 222 and the second wireless earphone 224 transmit the determination result of whether the first wireless earphone 222 and the second wireless earphone 224 are worn on the user's ear to the electronic device 300 (e.g., the terminal).

As a result of the determination in operation 535, when the wireless earphones 222 and 224 are not worn on the user's ear, the wireless earphones 222 and 224 may output a location finding alarm to the speaker of the wireless earphones 222 and 224 by performing operation 530. For example, an alarm for finding the location of the first wireless earphone 222 may be output at a volume greater than or equal to a first threshold (e.g., a volume greater than or equal to the first threshold may include the maximum volume), and an alarm for finding the location of the second wireless earphone 224 may be output at a volume greater than or equal to a first threshold (e.g., a volume greater than or equal to the first threshold may include the maximum volume).

As a result of the determination in operation 535, when the wireless earphones 222 and 224 are worn on the user's ear, in operation 540, the electronic device 300 (e.g., the terminal) may output a location finding alarm to the speakers of the wireless earphones 222 and 224. For example, an alarm for finding the location of the first wireless earphone 222 may be output at a volume equal to or lower than the second threshold (e.g., the volume equal to or lower than the second threshold may include the minimum volume) (or normal volume), and an alarm for finding the location of the second wireless earphone 224 may be output at a volume equal to or lower than the second threshold (e.g., the volume equal to or lower than the second threshold may include the minimum volume) (or normal volume).

According to an embodiment, in operation 535, the wireless earphones 222 and 224 may receive an output command of a location finding alarm from the electronic device 300 (e.g., a terminal) before determining whether they are worn on the user's ear. In this case, the wireless earphones 222 and 224 may perform operation 530 or operation 540, based on the determination result in operation 535.

According to an embodiment, in operation 535, the wireless earphones 222 and 224 may receive an output command of a location finding alarm from the electronic device 300 (e.g., the terminal) after determining whether the wireless earphones 222 and 224 are worn on the user's ear. In this case, the wireless earphones 222 and 224 may perform operation 530 or operation 540, based on the determination result in operation 535, or perform operation 530 or operation 540, based on information included in the output command of the location search alarm.

As an embodiment, when the communication connection between the electronic device 300 (e.g., the terminal) and the wireless earphones 222 and 224 is cut off, the electronic device 300 (e.g., the terminal) may attempt a communication connection with the cradle 210. When the electronic device 300 (e.g., terminal) and the cradle 210 are separated by a predetermined distance or more and communication is cut off, the cradle 210 may notify an alarm that the cradle 210 is separated from the electronic device 300 (e.g., the terminal) by a predetermined distance or more, through an application of the electronic device 300 (e.g., the terminal). For example, the electronic device 300 (e.g., the terminal) and the cradle 210 are connected by BLE communication, and search alarm for the wireless earphones 222 and 224 may be output through a program 320 (e.g., application software for wireless earphone control) embedded in the electronic device 300 (e.g., the terminal), and a warning sound for preventing loss may be output. In addition, the electronic device 300 (e.g., terminal) may output an alarm so as not to forget to carry the wireless earphones 222 and 224 and the cradle 210 when going out to provide user convenience.

The communication module (e.g., a Bluetooth low energy (BLE) communication module) embedded in the cradle 210 according to various embodiments of the present disclosure and the electronic device 300 (e.g., the terminal) are connected, and an operation of periodically checking the state (e.g., the state of charge of the batteries **222*d* and 224*d* of the wireless earphones 222 and 224, the state of charge of the battery 219 of the cradle 210) of the cradle 210 and/or the wireless earphones 222 and 224 may be performed. Through this, the charging state of the batteries 222*d* and 224*d* of the wireless earphones 222 and 224 and the charging state of the battery 219 of the cradle 210 may be determined, so that the need to charge the batteries may be signaled before the batteries 222*d* and 224*d* of the cradle 210 and/or the wireless earphones 222 and 224** are discharged.

At least some of the operations illustrated in FIG. 6 may be omitted. At least some operations mentioned with reference to other drawings in this document may be added and/or inserted before or after at least some operations illustrated in FIG. 6. All or some of the operations illustrated in FIG. 6 may be performed by a processor of the electronic device 300 (e.g., the processor 120 of FIG. 1 and the processor 320 of FIG. 3). All or some of the operations illustrated in FIG. 6 may be performed by the control device 214 of the cradle 210. All or some of the operations shown in FIG. 6 may be performed by the wireless earphones 222 and 224. For example, the memory of the electronic device 300 (e.g., the memory 130 of FIG. 1, the memory 330 of FIG. 3) may store instructions that, when executed, cause the processor (e.g., the processor 120 of FIG. 1 and the processor 320 of FIG. 3) to perform all or some operations illustrated in FIG. 6. For example, the memory included in the control device 214 of the cradle 210 may store instructions that, when executed, cause the control device 214 to perform all or some of the operations shown in FIG. 6. For example, the first memory of the first wireless earphone 222 (e.g., the first memory **222*h* of FIG. 2D) and/or the second memory of the second wireless earphone 2224 may store instructions that, when executed, cause the first processor (e.g., the first processor 222*a* in FIG. 2D) and/or the second processor to perform all or some of the operations illustrated in FIG. 6**.

Figure 7:
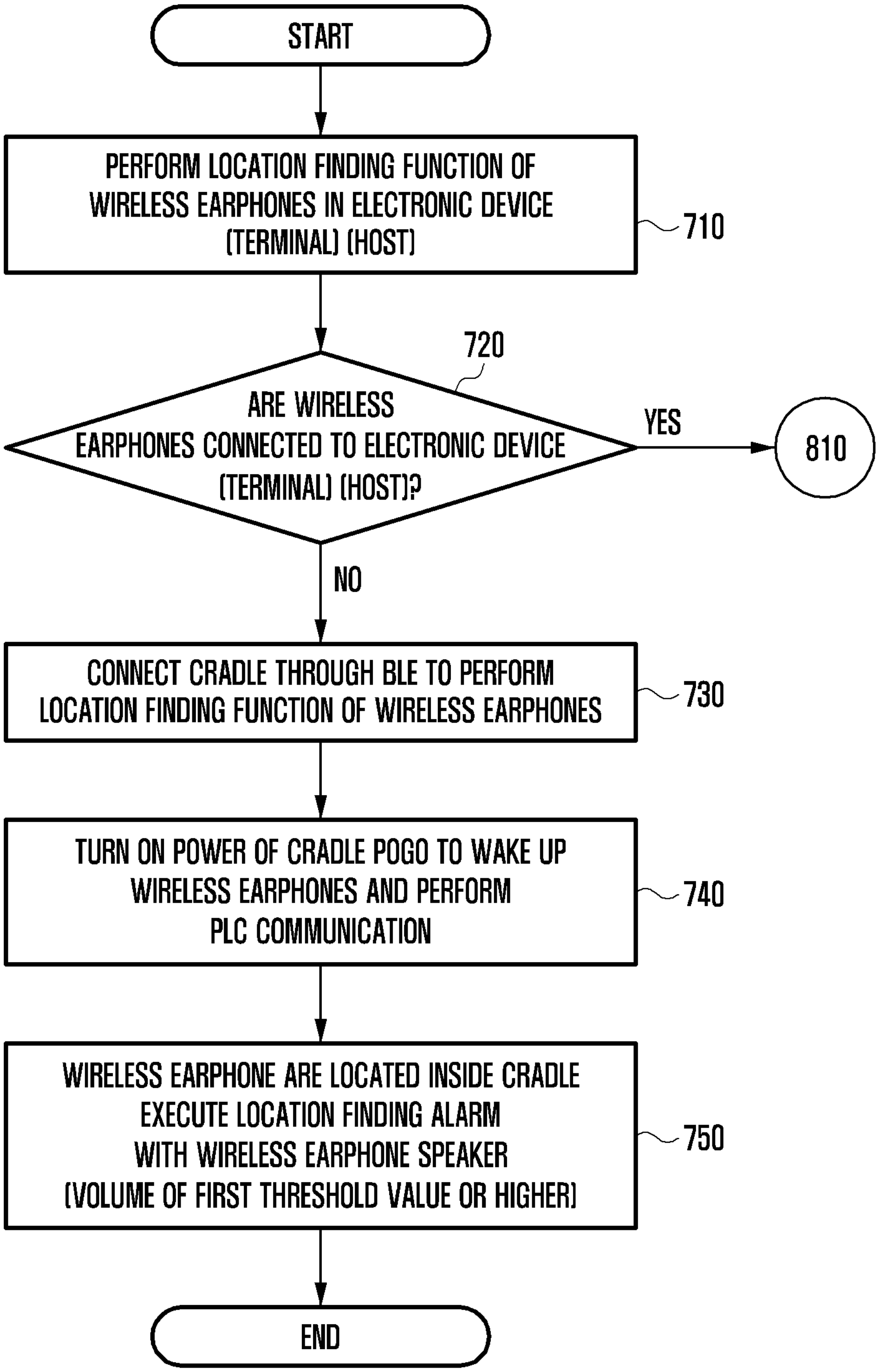
FIG. 7 is a diagram illustrating a method of operating an electronic device according to embodiments of the present disclosure.

FIG. 7 is a diagram illustrating a method of operating an electronic device according to embodiments of the present disclosure.

Referring to FIGS. 3, 5, and 7, in operation 710, the electronic device 300 (e.g., a terminal) may perform a location finding function of the wireless earphones 222 and 224. For example, the electronic device 300 (e.g., the terminal) may perform a function of finding the location of the wireless earphones 222 and 224 based on a request from a user.

In operation 720, the electronic device 300 (e.g., the terminal) may determine whether the wireless earphones 222 and 224 are connected to each other through wireless communication (e.g., Bluetooth or Bluetooth low energy (BLE)).

As a result of the determination in operation 720, when the electronic device 300 (e.g., the terminal) and the wireless earphones 222 and 224 are not connected in a wireless communication (e.g., Bluetooth or Bluetooth low energy (BLE)) method, the electronic device 300 (e.g., the terminal) may perform an operation to determine whether the wireless earphones 222 and 224 are located inside the cradle 210.

In operation 730, the electronic device 300 (e.g., the terminal) may perform a location finding function of the wireless earphones 222 and 224 by connecting to the cradle 210 through BLE communication. For example, the electronic device 300 (e.g., the terminal) may connect to the wireless communication module 212 of the cradle 210 through BLE communication through the wireless communication module 310 in order to identify whether the wireless earphones 222 and 224 are in the sleep mode (or power off mode) inside the cradle 210. The electronic device 300 (e.g., the terminal) may perform a location finding function of the wireless earphones 222 and 224 by connecting to the cradle 210 through BLE communication. According to an embodiment, the cradle 210 may receive data related to the location finding function of the wireless earphones 222 and 224 from the electronic device 300 (e.g., the terminal) through BLE communication. For example, the data related to the location finding function of the wireless earphones 222 and 224 received from the electronic device 300 (e.g., the terminal) may include information (e.g., a Bluetooth address) of the wireless earphones 222 and 224.

In operation 740, the cradle 210, which has received data related to the location finding function of the wireless earphones 222 and 224 from the electronic device 300 (e.g., the terminal) may turn on the power of a first charging pin (e.g., a first charging pin 232 of FIG. 2A) (e.g., a first charging connector) and a second charging pin (e.g., a second charging pin 234 of FIG. 2A) of the cradle 210 to wake up the wireless earphones 222 and 224. Thereafter, the cradle 210 may perform PLC communication with the wireless earphones 222 and 224. According to an embodiment, the cradle 210 receives information (e.g., a Bluetooth address) of the wireless earphones 222 and 224 by performing PLC communication with the wireless earphones 222 and 224, and may identify whether the information received from the electronic device 300 (e.g., the terminal) is the same. According to an embodiment, the cradle 210 may transmit a wireless earphone search operation command to the wireless earphones 222 and 224. For example, the cradle 210 may transmit a wireless earphone finding operation command to the wireless earphones 222 and 224 in a PLC communication or wireless communication (e.g., Bluetooth or low-power Bluetooth (BLE)) method.

In operation 750, in a state where both wireless earphones 222 and 224 are located (e.g., seated) inside the cradle 210, the wireless earphones 222 and 224 that have received the wireless earphone search operation command may output an alarm for finding a location at a volume greater than or equal to a first threshold (e.g., a volume greater than or equal to the first threshold may include the maximum volume). For example, the location finding alarm output from the first wireless earphone 222 may be output to the outside through the first acoustic reflection hole (e.g., the first acoustic reflection hole 242 of FIG. 2A) of the cradle 210. The location finding alarm output from the second wireless earphone 224 may be output to the outside through the second acoustic reflection hole (e.g., the second acoustic reflection hole 244 of FIG. 2A) of the cradle 210. For example, the volume level of the location finding alarm of the first wireless earphone 222 may be configured in the electronic device 300 (e.g., the terminal) or may be configured in the cradle 210, or may be configured in the first wireless earphone 222. For example, the volume level of the location finding alarm of the second wireless earphone 224 may be configured in the electronic device 300 (e.g., the terminal), may be configured in the cradle 210, or may be configured in the second wireless earphone 224.

Figure 8:
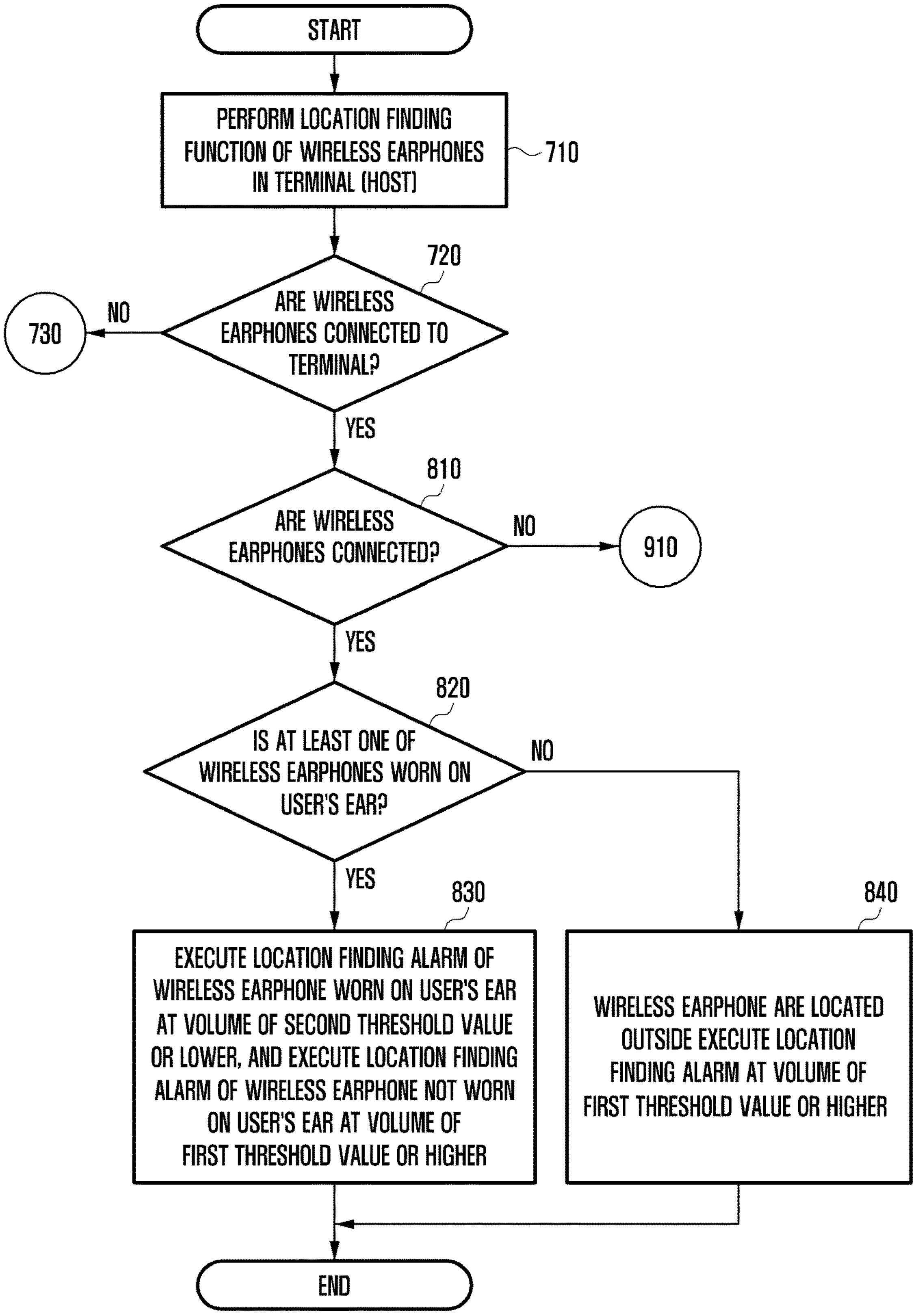
FIG. 8 is a diagram illustrating a method of operating an electronic device according to embodiments of the present disclosure.

As a result of the determination in operation 720, when the electronic device 300 (e.g., the terminal) and the wireless earphones 222 and 224 are connected through a wireless communication (e.g., Bluetooth or Bluetooth Low Energy (BLE)) method, the electronic device 300 (e.g., the terminal) may determine that the wireless earphones 222 and 224 are located outside the cradle 210, and may perform operation 810 of FIG. 8.

At least some of the operations illustrated in FIG. 7 may be omitted. At least some operations mentioned with reference to other drawings in this document may be added and/or inserted before or after at least some operations illustrated in FIG. 7. All or some of the operations illustrated in FIG. 7 may be performed by a processor (e.g., the processor 120 of FIG. 1 and the processor 320 of FIG. 3) of the electronic device 300 (e.g., the terminal). All or some of the operations illustrated in FIG. 7 may be performed by the control device 214 of the cradle 210. All or some of the operations shown in FIG. 7 may be performed by the wireless earphones 222 and 224. For example, the memory of the electronic device 300 (e.g., the memory 130 of FIG. 1, the memory 330 of FIG. 3) may store instructions that, when executed, cause the processor (e.g., the processor 120 of FIG. 1 and the processor 320 of FIG. 3) to perform all or some of the operations illustrated in FIG. 7. The processor 320 may store instructions for performing all or some of the operations illustrated in FIG. 7. For example, the memory included in the control device 214 of the cradle 210 may store instructions that, when executed, cause the control device 214 to perform all or some of the operations shown in FIG. 7. For example, the first memory of the first wireless earphone 222 (e.g., the first memory 222*h* in FIG. 2D) and/or the second memory of the second wireless earphone 2224 may store instructions that, when executed, cause the first processor (e.g., the first processor 222*a* in FIG. 2D) and/or the second processor to perform all or some of the operations illustrated in FIG. 7.

FIG. 8 is a diagram illustrating a method of operating an electronic device according to embodiments of the present disclosure.

Referring to FIGS. 3, 5, 7, and 8, operations 710 and 720 may be the same as those described with reference to FIG. 7.

In operation 810, the electronic device 300 (e.g., the terminal) may determine whether both wireless earphones 222 and 224 are connected through wireless communication (e.g., Bluetooth or Bluetooth Low Energy (BLE)).

Figure 9:
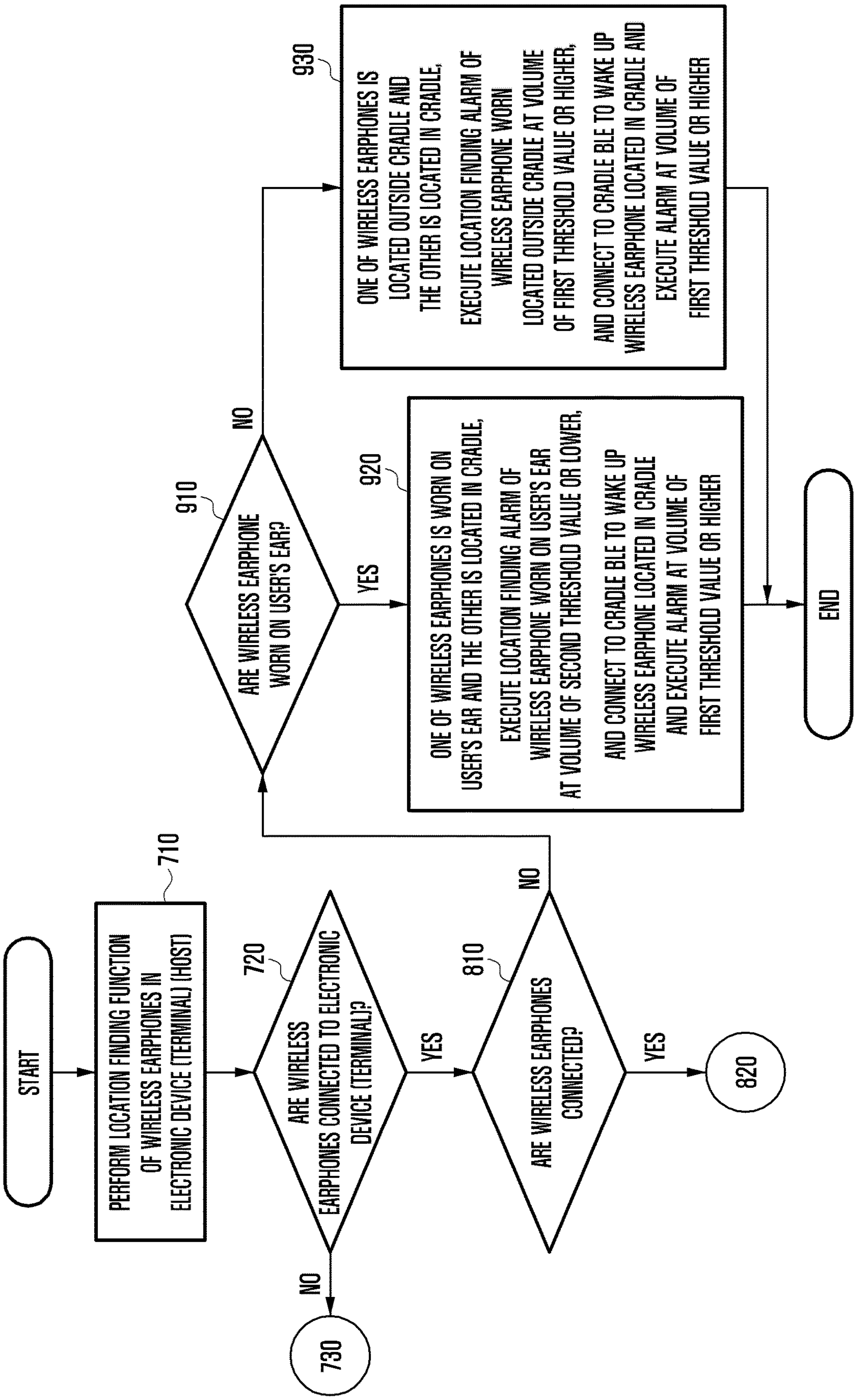
FIG. 9 is a diagram illustrating a method of operating an electronic device according to embodiments of the present disclosure.

As a result of determination in operation 810, when the wireless earphones 222 and 224 are not connected to the electronic device 300 (e.g., the terminal) by wireless communication (e.g., Bluetooth or Bluetooth Low Energy (BLE)), the electronic device 300 (e.g., the terminal) may determine that the wireless earphones 222 and 224 have different positions, and may perform operation 910 of FIG. 9.

As a result of the determination in operation 810, when the wireless earphones 222 and 224 are connected to the electronic device 300 (e.g., the terminal) by wireless communication (e.g., Bluetooth or Bluetooth Low Energy (BLE)), the electronic device 300 (e.g., the terminal) may determine whether at least one of the wireless earphones 222 and 224 is worn on the user's ear in operation 820. For example, the first wireless earphone 222 may sense whether the first wireless earphone 222 is worn on the user's ear through a first wear detection sensor (e.g., the first wear detection sensor 2223 of FIG. 2B). The second wireless earphone 224 may sense whether the second wireless earphone 224 is worn on the user's ear through a second wear detection sensor (e.g., the second wear detection sensor 2243 of FIG. 2C).

According to an embodiment, the first wireless earphone 222 and the second wireless earphone 224 may provide a determination result of whether it is worn on the user's ear to the cradle 210 and/or the electronic device 300 (e.g., the terminal).

According to an embodiment, each of the first wireless earphone 222 and the second wireless earphone 224 may provide a determination result of whether or not it is worn on the user's ear to the cradle 210 and/or the electronic device 300 (e.g., the terminal).

According to another embodiment, the device configured as a peripheral (or secondary) device among the first wireless earphone 222 and the second wireless earphone 224 may provide a determination result of whether the first wireless earphone 222 and/or the second wireless earphone 224 is worn on the user's ear to the cradle 210 and/or the electronic device 300 (e.g., the terminal). For example, a device (e.g., a second wireless earphone 224) operating as a peripheral (or secondary) among the first wireless earphone 222 and the second wireless earphone 224 may transmit the determination result of whether it is worn on the user's ear as a wireless earphone (e.g., the first wireless earphone 222) configured as a central (or, primary, or main) device, and the wireless earphone (e.g., the first wireless earphone 222) configured as a central (or, primary, or main) device may transmit the determination result to the cradle 210 and/or the electronic device 300 (e.g., the terminal). As a result of the determination in operation 820, as an embodiment, when at least one of the wireless earphones 222 and 224 is worn on the user's ear, in operation 830, the electronic device 300 (e.g., the terminal) may output a location finding alarm of an earphone (e.g., the first wireless earphone 222 and/or the second wireless earphone 224) worn on the user's ear among the wireless earphones 222 and 224 at a volume (e.g., volumes of less than or equal to the second threshold include minimum volumes) (or normal volumes) of less than or equal to the second threshold. For example, the earphone (e.g., the first wireless earphone 222 and/or the second wireless earphone 224) worn on the user's ear among the wireless earphones 222 and 224 may be configured so that the location finding alarm is output at a volume of less than or equal to the second threshold (e.g., the volume of less than or equal to the second threshold may include the minimum volume) (or normal volume).

For another example, the volume level of the location finding alarm of the earphone (e.g., the first wireless earphone 222 and/or the second wireless earphone 224) worn on the user's ear among the wireless earphones 222 and 224 may be configured in the electronic device 300 (e.g., the terminal).

For another example, the volume level of the location finding alarm of the earphone (e.g., the first wireless earphone 222 and/or the second wireless earphone 224) worn on the user's ear among the wireless earphones 222 and 224 may be configured in the cradle 210.

For another example, the volume level of the location finding alarm of the earphone (e.g., the first wireless earphone 222 and/or the second wireless earphone 224) worn on the user's ear among the wireless earphones 222 and 224 may be configured in the first wireless earphone 222 and/or the second wireless earphone 224.

As an embodiment, when the first wireless earphone 222 is worn on the user's ear and the second wireless earphone 224 is not worn on the user's ear, the electronic device 300 (e.g., the terminal) may output the location finding alarm of the first wireless earphone 222 at a volume (e.g., volumes of less than or equal to the second threshold include minimum volumes) (or normal volumes) less than or equal to the second threshold value, and may output the location finding alarm of the second wireless earphone 224 at a volume greater than or equal to a first threshold (e.g., a volume greater than or equal to the first threshold may include the maximum volume). As another example, the volume level of the location finding alarm of the wireless earphones 222 and 224 may be configured in the cradle 210 or the wireless earphones 222 and 224.

As an embodiment, when the second wireless earphone 224 is worn on the user's ear and the first wireless earphone 222 is not worn on the user's ear, the electronic device 300 (e.g., the terminal) may output the location finding alarm of the second wireless earphone 224 at a volume of less than or equal to the second threshold (e.g., the volume of less than or equal to the second threshold may include the minimum volume) (or normal volume), and may output the location finding alarm of the first wireless earphone 222 at a volume greater than or equal to a first threshold (e.g., a volume greater than or equal to the first threshold may include the maximum volume). As another example, the volume level of the location finding alarm of the wireless earphones 222 and 224 may be configured in the cradle 210 or the wireless earphones 222 and 224.

As a result of the determination in operation 820, when the wireless earphones 222 and 224 are not worn on the user's ear, the electronic device 300 (e.g., the terminal) may determine that the wireless earphones 222 and 224 are located outside the cradle 210.

In operation 840, the electronic device 300 (e.g., the terminal) may output the location finding alarm of the wireless earphones 222 and 224 located outside the cradle 210 at a volume (e.g., volume of greater than or equal to the first threshold include the maximum volume) greater than or equal to a first threshold value. According to various embodiments, when connected to the wireless earphones 222 and 224 in a wireless communication (e.g., Bluetooth or low-power Bluetooth (BLE)) method in operation 810, the electronic device 300 (e.g., the terminal) may transmit a command to output a location finding alarm to the wireless earphones 222 and 224. For example, the electronic device 300 (e.g., the terminal) may transmit a command to output a location finding alarm to each of the wireless earphones 222 and 224, or may transmit a command to generate a location finding alarm to a wireless earphone (e.g., the first wireless earphone 222) configured to the central (or, primary, or main). According to an embodiment, the wireless earphones 222 and 224 that have received a command to output a location finding alarm from the electronic device 300 (e.g., the terminal) may output a location finding alarm at a volume greater than or equal to a first threshold (e.g., a volume greater than or equal to the first threshold may include a maximum volume).

At least some of the operations illustrated in FIG. 8 may be omitted. At least some operations mentioned with reference to other drawings in this document may be added and/or inserted before or after at least some operations illustrated in FIG. 8. All or some of the operations illustrated in FIG. 8 may be performed by a processor (e.g., the processor 120 of FIG. 1 and the processor 320 of FIG. 3) of the electronic device 300 (e.g., the terminal). All or some of the operations illustrated in FIG. 8 may be performed by the control device 214 of the cradle 210. All or some of the operations shown in FIG. 8 may be performed by the wireless earphones 222 and 224. For example, the memory of the electronic device 300 (e.g., the memory 130 of FIG. 1 and the memory 330 of FIG. 3) may store instructions that, when executed, cause the processor (e.g., the processor 120 of FIG. 1 and the processor 320 of FIG. 3) to perform all or some of the operations illustrated in FIG. 8. For example, the memory included in the control device 214 of the cradle 210 may store instructions that, when executed, cause the control device 214 to perform all or some of the operations shown in FIG. 8. For example, the first memory of the first wireless earphone 222 (e.g., the first memory **222*h* in FIG. 2D) and/or the second memory of the second wireless earphone 2224 may stores instructions that, when executed, cause the first processor (e.g., the first processor 222*a* in FIG. 2D) and/or the second processor to perform all or some of the operations illustrated in FIG. 4**.

FIG. 9 is a diagram illustrating a method of operating an electronic device according to embodiments of the present disclosure.

Referring to FIGS. 3, 5, 7, 8, and 9, as a result of the determination in operation 810 of FIG. 8, when the wireless earphones 222 and 224 are not connected to the electronic device 300 (e.g., a terminal) in a wireless communication (e.g., Bluetooth or low energy Bluetooth (BLE)) method, in operation 910, the first wireless earphone 222 may sense whether the first wireless earphone 222 is worn on the user's ear through a first wear detection sensor (e.g., the first wear detection sensor 2223 of FIG. 2B). The second wireless earphone 224 may sense whether the second wireless earphone 224 is worn on the user's ear through a second wear detection sensor (e.g., the second wear detection sensor 2243 of FIG. 2C). The sensing result of whether the wireless earphones 222 and 224 are worn on the user's ear may be provided to the electronic device 300 (e.g., the terminal) or the cradle 210. For example, when the cradle 210 receives the sensory result of whether the first wireless earphone 222 and/or the second wireless earphone 224 is worn on the user's ear, the cradle 210 may transmit a result of sensing whether the first wireless earphone 222 and/or the second wireless earphone 224 is worn on the user's ear to the electronic device 300 (e.g., the terminal).

As an embodiment, the electronic device 300 (e.g., the terminal) may receive the result of sensing whether the first wireless earphone 222 is worn on the user's ear from the first wireless earphone 222 through the first wear detection sensor of the first wireless earphone 222 (e.g., the first wear detection sensor 2223 of FIG. 2B). As another example, the electronic device 300 (e.g., the terminal) may receive the result of sensing whether the second wireless earphone 224 is worn on the user's ear from the second wireless earphone 224 through the second wear detection sensor of the second wireless earphone 224 (e.g., the second wear detection sensor 2243 of FIG. 2C).

As an embodiment, the electronic device 300 (e.g., the terminal) may determine whether at least one of the wireless earphones 222 and 224 connected through a wireless communication method (e.g., Bluetooth or Bluetooth low energy (BLE)) is worn on the user's ear. As an embodiment, among the wireless earphones 222 and 2224, the first wireless earphone 222 may be worn on the user's ear, and the second wireless earphone 224 may be located inside the cradle 210. In operation 920, the electronic device 300 (e.g., the terminal) may output a location finding alarm at a volume of the first wireless earphone 222 worn on the user's ear at a volume (e.g., volumes less than or equal to the second threshold include minimum volume) less than or equal to the second threshold value. the electronic device 300 (e.g., the terminal) may allow the second wireless earphone 224 located (e.g., seated) inside the cradle 210 to output a location finding alarm at a volume higher than or equal to the first threshold (e.g., a volume higher than the first threshold may include the maximum volume) after being connected to the cradle 210 to wake up. Here, the electronic device 300 (e.g., the terminal) may connect the cradle 210 and the second wireless earphone 224 through BLE communication so that the cradle 210 wakes up the second wireless earphone 224, and then, may cause the second wireless earphone 224 to output a location finding alarm at a volume greater than or equal to the first threshold (e.g., a volume greater than or equal to the first threshold may include the maximum volume). As another example, the volume level of the location finding alarm of the first wireless earphone 222 and the second wireless earphone 224 may be configured in the cradle 210, or may be configured in the first wireless earphone 222 and the second wireless earphone 224.

As a result of the determination in operation 910, when the wireless earphones 222 and 224 are not worn on the user's ear, operation 930 may be performed.

As an embodiment, when the wireless earphones 222 and 224 are not worn on the user's ear, one of the wireless earphones 222 and 224 (e.g., the first wireless earphone 222) may be located outside (e.g., not worn on the user's ear) of the cradle 210, and the other one (e.g., the second wireless earphone 224) may be located inside the cradle 210.

In operation 930, as an embodiment, the electronic device 300 (e.g., the terminal) may cause the wireless earphone (e.g., the first wireless earphone 222) located outside the cradle 210 to output a location finding alarm at a volume greater than or equal to a first threshold (e.g., a volume greater than or equal to the first threshold may include the maximum volume). As an embodiment, the electronic device 300 (e.g., the terminal) may cause the wireless earphone (e.g., the second wireless earphone 224) located inside the cradle 210 to be connected and wake up, and to output the location finding alarm at a volume greater than or equal to the first threshold (e.g., a volume greater than or equal to the first threshold may include the maximum volume). Here, the electronic device 300 (e.g., the terminal) may connect with the cradle 210 through BLE communication and the cradle 210 may wake up the second wireless earphone 224, and then, a location search alarm may be output at a volume greater than or equal to the first threshold (e.g., a volume greater than or equal to the first threshold may include the maximum volume). The electronic device 300 (e.g., the terminal) may cause the second wireless earphone 224 located outside the cradle 210 to output a location finding alarm at a volume greater than or equal to a first threshold (e.g., a volume greater than or equal to the first threshold may include the maximum volume).

As another example, the volume level of the location finding alarm of the first wireless earphone 222 and the second wireless earphone 224 may be configured in the cradle 210 or the wireless earphones 222 and 224.

In operation 920, it has been described that the first wireless earphone 222 is worn on the user's ear and the second wireless earphone 224 is located inside the cradle 210. According to another embodiment, the first wireless earphone 222 may be located inside the cradle 210, and the second wireless earphone 224 may be worn on the user's ear. In this case, the first wireless earphone 222 may output a location finding alarm at a volume greater than or equal to the first threshold (e.g., the volume greater than or equal to the first threshold may include the maximum volume), and the second wireless earphone 224 may output a location finding alarm at a volume less than or equal to the second threshold (e.g., a volume less than or equal to the second threshold may include the minimum volume).

In operation 930, it has been described that the first wireless earphone 222 is located outside the cradle and the second wireless earphone 224 is located inside the cradle. According to another embodiment, the first wireless earphone 222 may be located inside the cradle, and the second wireless earphone 224 may be located outside the cradle. In this case, the first wireless earphone 222 and the second wireless earphone 224 may output a location finding alarm at a volume greater than or equal to a first threshold (e.g., a volume greater than or equal to the first threshold may include the maximum volume). At least some of the operations illustrated in FIG. 9 may be omitted. At least some operations mentioned with reference to other drawings in this document may be added and/or inserted before or after at least some operations illustrated in FIG. 9. All or some of the operations illustrated in FIG. 9 may be performed by a processor (e.g., the processor 120 of FIG. 1 and the processor 320 of FIG. 3) of the electronic device 300 (e.g., the terminal). All or some of the operations illustrated in FIG. 9 may be performed by the control device 214 of the cradle 210. All or some of the operations shown in FIG. 4 may be performed by the wireless earphones 222 and 224. For example, the memory (e.g., the memory 130 of FIG. 1, the memory 330 of FIG. 3) of the electronic device 300 (e.g., the terminal) may store instructions that, when executed, cause the processor (e.g., the processor 120 of FIG. 1 and the processor 320 of FIG. 3) to perform all or some of the operations illustrated in FIG. 9. For example, the memory included in the control device 214 of the cradle 210 may store instructions that, when executed, cause the control device 214 to perform all or some of the operations shown in FIG. 9. For example, the first memory of the first wireless earphone 222 (e.g., the first memory **222*h* in FIG. 2D) and/or the second memory of the second wireless earphone 2224 may store instructions that, when executed, cause the first processor (e.g., the first processor 222*a* in FIG. 2**D)

and/or the second processor to perform all or some of the operations illustrated in FIG. 4.

The electronic device 200 (e.g., an external device, an electronic device including the cradle 210 and the wireless earphones 222 and 224) according to various embodiments of the present disclosure may be connected to the electronic device 300 (e.g., the terminal) (e.g., a smartphone, a smart watch, a tablet PC, or a notebook PC) and the wireless communication module 212 (e.g., Bluetooth low energy (BLE) communication module) built in the cradle 210 to output an alarm for finding the location of the wireless earphones 222 and 223.

According to various embodiments of the present disclosure, a communication module 212 (e.g., a Bluetooth low energy (BLE) communication module) built into the cradle 210 and an electronic device 300 (e.g., a terminal) (e.g., a smartphone, a smart watch, a tablet PC, or a notebook PC) may be connected, and may perform a remote control implementation function to periodically check the state of the wireless earphones 222 and 224 (e.g., the charging state of the batteries **222*d* and 224*d* of the wireless earphone, or the charging state of the battery 219 of the cradle 210). Through this, it is possible to determine the charging state of the batteries 222*d* and 224*d* of the wireless earphones 222 and 224 and the charging state of the battery 219 of the cradle 210**, so as to notify the need for charging the battery before the battery is discharged.

Various embodiments of the present disclosure may provide information such as a pop-up message through a program 320 (e.g., application software for wireless earphone control) embedded in an electronic device 300 (e.g., a terminal) (e.g., a smartphone, a smartwatch, a tablet PC, a laptop PC) to prevent the loss of wireless earphones (222 and 224) using Bluetooth or BLE connection, or to not forget to carry wireless earphones (222 and 224) when going out.

The electronic device (e.g., the electronic device 200 of FIG. 2A) according to embodiments of the present disclosure may include a first wireless earphone (e.g., the first wireless earphone 222 of FIGS. 2A, 2B, and 3), a second wireless earphone (e.g., the second wireless earphone 224 of FIGS. 2A, 2B, and 3), and a cradle (e.g., the cradle 210 of FIGS. 2A and 3) on which the first wireless earphone 222 and the second wireless earphone 224 are seated. The cradle 210 may include a processor, a control device including a memory operatively connected to the processor (e.g., the control device 214 of FIG. 3), communication modules (e.g., the wireless communication module 212 and the wired communication module 218 of FIG. 3) for connecting communication with an external terminal (e.g., the electronic device 101 of FIG. 1, and the electronic device 300 of FIGS. 3, 4A, and 4B) and/or for connecting communication with the first wireless earphone 222 and the second wireless earphone 224 under the control of the processor, and a power supply (e.g., the power supply 216 of FIG. 3) for charging the batteries (e.g., the first battery **222*d* and the second battery 224*d* of FIG. 3) of the first wireless earphone 222 and the second wireless earphone 224. The control device 214 may transmit a location search alarm command from the external terminal 300 to at least one of the first wireless earphone 222 and/or the second wireless earphone 224** in a wired communication method.

According to an embodiment, the cradle 210 may include a first acoustic reflection hole (e.g., the first acoustic reflection hole 242 in FIG. 2A) formed adjacent to the position where the first wireless earphone 222 is disposed, and a second acoustic reflection hole (e.g., the second acoustic reflection hole 244 of FIG. 2A) formed adjacent to the position where the second wireless earphone 224 is disposed.

According to an embodiment, the communication modules 212 and 218 may include a wireless communication module 212. The wireless communication module 212 may include a Bluetooth and/or Bluetooth low energy (BLE) communication module. The external terminal 300 and the cradle 210 may be connected through Bluetooth or BLE communication.

According to an embodiment, the external terminal 300 and the first wireless earphone 222 and the second wireless earphone 224 may be connected by Bluetooth or BLE communication.

According to an embodiment, the communication modules 212 and 218 may include a wired communication module 218. The wired communication module 218 may include a power line communication (PLC) communication module. The cradle 210 may include a first charging pin (e.g., a first charging pin 232 of FIG. 2A) for charging and wired communication of the first wireless earphone 222, and a second charging pin (e.g., a second charging pin 234 of FIG. 2A) for charging and wired communication of the second wireless earphone 224.

According to an embodiment, the cradle 210 may perform communication in a PLC manner to determine whether the first wireless earphone 222 and the second wireless earphone 224 are located inside the cradle 210.

According to an embodiment, the cradle 210 may transmit a location finding alarm command to the first wireless earphone 222 in a PLC manner through the first charging pin 232 when the first wireless earphone 222 is located inside the cradle 210.

According to an embodiment, the first wireless earphone 222 may output a location finding alarm at a volume greater than or equal to a first threshold, based on the command of the location finding alarm.

According to an embodiment, the cradle 210 may transmit a location finding alarm command to the second wireless earphone 224 in a PLC manner through the second charging pin when the second wireless earphone 224 is located inside the cradle 210.

According to an embodiment, the second wireless earphone 224 may output a location finding alarm at a volume greater than or equal to a first threshold, based on the command of the location finding alarm.

According to an embodiment, the first wireless earphone 222 may include a first wear detection sensor (e.g., a first wear detection sensor 2223 of FIG. 2B) for sensing the wear of the user's ear. The first wireless earphone 222 may transmit detection data of whether the user's ear is worn to the cradle 210 or the external terminal 300.

According to an embodiment, when the first wireless earphone 222 is worn on the user's ear, the first wireless earphone 222 may output a location finding alarm at a volume less than or equal to a second threshold, based on the command of the location finding alarm.

According to an embodiment, when the first wireless earphone 222 is worn on the user's ear, the first wireless earphone 222 may not output a location finding alarm.

According to an embodiment, the second wireless earphone 224 may include a second wear detection sensor (e.g., the wear detection sensor 2243 of FIG. 2C) for sensing the wear of the user's ear. The second wireless earphone 224 may transmit detection data of whether the user's ear is worn to the cradle 210 or the external terminal 300.

According to an embodiment, when the second wireless earphone 224 is worn on the user's ear, the second wireless earphone 224 may output a location finding alarm at a volume less than or equal to a second threshold, based on the command of the location finding alarm.

According to an embodiment, when the second wireless earphone 224 is worn on the user's ear, the second wireless earphone 224 may not output a location finding alarm.

An electronic device (e.g., the electronic device 101 of FIG. 1, and the electronic device 300 of FIG. 3) according to various embodiments may include a wireless communication module (e.g., the wireless communication module 192 of FIG. 1) for communication connection with an external device (e.g., the electronic device 200 of FIG. 2A) including a plurality of wireless earphones (e.g., a plurality of wireless earphones 222 and 224 of FIGS. 2A and 3) and a cradle 210 on which the plurality of wireless earphones (e.g., the plurality of wireless earphones 222 and 224 of FIGS. 2A and 3) are seated, a processor (e.g., the processor 120 of FIG. 1, processor 320 of FIG. 3) operatively coupled to the wireless communication module 192, 310, a memory (e.g., the memory 130 of FIG. 1, the memory 330 of FIG. 3) operatively connected to the processor 120, 320 and storing a program for controlling the operation of the external device 200. The memory 130, 330 may include instructions, when executed, for controlling the processor 120, 320 to check the communication connection with the cradle 210 and the plurality of wireless earphones 222, 224, and control the cradle 210 and the plurality of wireless earphones 222, 224 so that a location finding alarm is output from the plurality of wireless earphones 222, 224, based on the positions of the plurality of wireless earphones 222, 224.

According to an embodiment, the wireless communication module 192, 310 may include a Bluetooth and/or Bluetooth low energy (BLE) communication module. The wireless communication module 192, 310 may be connected to the cradle 210, and the plurality of wireless earphones 222, 224 through the Bluetooth or BLE communication.

According to an embodiment, the location finding alarm command may be transmitted to the cradle 210 or the wireless earphones 222, 224 through the Bluetooth or the BLE method.

According to an embodiment, the location finding alarm of a wireless earphone located inside the cradle 210 among the plurality of wireless earphones 222, 224 may be controlled to be output at a volume greater than or equal to a first threshold.

According to an embodiment, among the plurality of wireless earphones 222, 224, the position finding alarm of the wireless earphone worn on the user's ear is controlled to be output to a volume of a second threshold or low.

According to an embodiment, the location finding alarm of a wireless earphone located outside the cradle 210 and not worn on the user's ear among the plurality of wireless earphones 222 and 224 is controlled to be output at a volume greater than or equal to a first threshold.

An electronic device according to various embodiments of the present disclosure may be connected to a communication module (e.g., a Bluetooth low energy (BLE) communication module) embedded in a terminal (e.g., smartphone, smart watch, tablet PC, or notebook PC) and a cradle to output an alarm for finding the location of wireless earphones.

In an electronic device according to various embodiments of the present disclosure, the communication module (e.g., BLE (Bluetooth low energy) communication module) built into the cradle and the terminal (e.g., smartphone, smart watch, tablet PC, or notebook PC) are connected, so that a remote control implementation function of periodically checking the state of the wireless earphones (e.g., the battery charging state of the wireless earphone or the charging state of the cradle battery) may be performed. Through this, the battery charge state of the wireless earphones or the battery charge state of the cradle may be determined, so that the necessity of charging the battery may be notified before the battery is discharged.

An electronic device according to various embodiments of the present disclosure may provide information such as a pop-up message through a program (e.g., application software for controlling wireless earphones) embedded in a terminal (e.g., a smartphone, a smart watch, a tablet PC, or a notebook PC) in order to prevent loss of wireless earphones using Bluetooth or BLE connection status or not to forget to carry wireless earphones when going out.

While this disclosure has been shown and described with reference to various embodiments thereof, it will be understood by those skilled in the art that various changes in form and detail may be made therein without departing from the spirit and scope of the following disclosure. It is defined by the appended claims and their equivalents.

What is claimed is:

1. An electronic device comprising:

a first wireless earphone;

a second wireless earphone; and a cradle on which the first wireless earphone and the second wireless earphone are disposed, wherein the cradle comprises:

- a control device comprising a processor and memory operatively coupled to the processor;
- communication modules configured to communicate with an external terminal or for communication between the first wireless earphone and the second wireless earphone; and
- a power supply for charging a battery of the first wireless earphone and a battery of the second wireless earphone, wherein the control device is configured to:

- when the first wireless earphone and the second wireless earphone are located inside the cradle, transmit a first location finding alarm command to the first wireless earphone and the second wireless earphone causing the first wireless earphone and the second wireless earphone to output a location finding alarm at a first volume greater than or equal to a first threshold,
- when at least one of the first wireless earphone or the second wireless earphone is located outside the cradle, determine whether the at least one of the first wireless earphone or the second wireless earphone is worn on a user's ear;
- based on determining that the at least one of the first wireless earphone or the second wireless earphone is worn on the user's ear, transmit a second location finding alarm command to the at least one of the first wireless earphone or the second wireless earphone, causing the location finding alarm to be output at a second volume lower than the first volume in the at least one of the first wireless earphone or the second wireless earphone;
- based on determining that the at least one of the first wireless earphone or the second wireless earphone is located outside the cradle and determining that neither the first wireless earphone nor the second wireless earphone is worn on the user's ear, transmit a third location finding alarm command to the first wireless earphone and the second wireless earphone, causing the location finding alarm to be output at the first volume; and based on determining that one of the first wireless earphone and the second wireless earphone is located inside the cradle and other one of the first wireless earphone and the second wireless earphone is located outside the cradle and not worn on the user's ear, transmit a fourth location finding alarm command to the other one of the first wireless earphone and the second wireless earphone located outside the cradle to cause the other one of the first wireless earphone and the second wireless earphone located outside the cradle to output the location finding alarm at the first volume, wake up the one of the first wireless earphone and the second wireless earphone located inside the cradle for outputting the location finding alarm at the first volume through the one located inside cradle.

2. The electronic device of claim 1, wherein the cradle further comprises:

a first acoustic reflection hole formed adjacent to a first position where the first wireless earphone is disposed; and a second acoustic reflection hole formed adjacent to a second position where the second wireless earphone is disposed.

3. The electronic device of claim 1, wherein the communication modules comprise a wireless communication module, wherein the wireless communication module comprises a Bluetooth module or a Bluetooth Low Energy (BLE) communication module, and wherein the external terminal and the cradle are connected through Bluetooth communication or through BLE communication.

4. The electronic device of claim 3, wherein the external terminal and the first wireless earphone and the second wireless earphone are connected by the Bluetooth communication or the BLE communication.

5. The electronic device of claim 1, wherein the communication modules comprise a wired communication module, wherein the wired communication module comprises a Power Line Communication (PLC) module, and wherein the cradle comprises:

a first charging pin for charging the first wireless earphone and for wired communication with the first wireless earphone, and a second charging pin for charging the second wireless earphone and for wired communication with the second wireless earphone.

6. The electronic device of claim 5, wherein the cradle performs communication in a PLC manner to determine whether the first wireless earphone and the second wireless earphone are located inside the cradle.

7. The electronic device of claim 6, wherein the cradle transmits the first location finding alarm command to the first wireless earphone in the PLC manner through the first charging pin.

8. The electronic device of claim 1, wherein the control device is further configured to:

when the second wireless earphone is located outside the cradle and worn on the user's ear, transmit the second location finding alarm command to the second wireless earphone causing the second wireless earphone to output the location finding alarm at the second volume lower than the first volume.

9. The electronic device of claim 8, wherein the control device is further configured to:

when the second wireless earphone is located inside the cradle, transmit the third location finding alarm command to the second wireless earphone causing the second wireless earphone to output the location finding alarm at the first volume greater than or equal to the first threshold.

10. The electronic device of claim 1, wherein the first wireless earphone comprises a first wear detection sensor for sensing whether the first wireless earphone is worn on the user's ear, and wherein the first wireless earphone is configured to transmit first detection data of whether the first wireless earphone is worn on the user's ear or not.

11. The electronic device of claim 10, wherein the first wireless earphone outputs the location finding alarm at the second volume lower than the first volume based on the second location finding alarm command when the first wireless earphone is worn on the user's ear.

12. The electronic device of claim 10, wherein the first wireless earphone does not output the location finding alarm when the first wireless earphone is worn on the user's ear.

13. The electronic device of claim 1, wherein the second wireless earphone comprises a second wear detection sensor for sensing whether the second wireless earphone is worn on the user's ear, and wherein the second wireless earphone is configured to transmit second detection data of whether the second wireless earphone is worn on the user's ear or not.

14. The electronic device of claim 8, wherein the second wireless earphone does not output the location finding alarm when the second wireless earphone is worn on the user's ear.

15. The electronic device of claim 1, wherein the control device is configured to:

when the first wireless earphone and the second wireless earphone are located outside the cradle, the first wireless earphone is worn on the user's ear, and the second wireless earphone is not worn on the user's ear, transmit the second location finding alarm command to the first wireless earphone causing the location finding alarm to be output at the second volume, and transmit the third location finding alarm command to the second wireless earphone causing the location finding alarm to be output at the first volume.

16. An electronic device comprising:

a wireless communication module for communication with an external device, the external device comprising a plurality of wireless earphones and a cradle on which the plurality of wireless earphones are disposed, the plurality of wireless earphones comprising a first wireless earphone and a second wireless earphone;

a processor operatively coupled to the wireless communication module; and a memory operatively connected to the processor and storing a program for controlling an operation of the external device, wherein the memory comprises instructions, when executed, for controlling the processor to:

check communication with the cradle and the plurality of wireless earphones; and control the cradle and the plurality of wireless earphones so that:

when the first wireless earphone and the second wireless earphone are located inside the cradle, the cradle is controlled to transmit a first location finding alarm command to the first wireless earphone and the second wireless earphone causing the first wireless earphone and the second wireless earphone to output a location finding alarm at a first volume greater than or equal to a first threshold, when the first wireless earphone or the second wireless earphone are located outside the cradle, the cradle is controlled to determine whether at least one of the first wireless earphone or the second wireless earphone is worn on a user's ear, based on determining that the at least one of the first wireless earphone and the second wireless earphone is worn on the user's ear, the cradle is controlled to transmit a second location finding alarm command to the at least one of the first wireless earphone and the second wireless earphone, causing the at least one of the first wireless earphone and the second wireless earphone to output the location finding alarm at a second volume lower than the first volume, based on determining the first wireless earphone or the second wireless earphone are located outside the cradle and determining that neither the first wireless earphone nor the second wireless earphone is worn on the user's ear, the cradle is controlled to transmit a third location finding alarm command to the first wireless earphone and the second wireless earphone, causing the location finding alarm to be output at the first volume, and based on determining that one of the first wireless earphone and the second wireless earphone is located inside the cradle and other one of the first wireless earphone and the second wireless earphone is located outside the cradle and not worn on the user's ear, the cradle is controlled to transmit a fourth location finding alarm command to the other one of the first wireless earphone and the second wireless earphone located outside the cradle to cause the other one of the first wireless earphone and the second wireless earphone located outside the cradle to output the location finding alarm at the first volume, wake up the one of the first wireless earphone and the second wireless earphone located inside the cradle for outputting the location finding alarm at the first volume through the one located inside cradle.

17. The electronic device of claim 16, wherein the wireless communication module comprises a Bluetooth module or a Bluetooth Low Energy (BLE) communication module, and wherein the wireless communication module is connected to the cradle and the plurality of wireless earphones through Bluetooth communication or BLE communication.

18. The electronic device of claim 17, wherein a location finding alarm command is transmitted to the cradle or the plurality of wireless earphones through the Bluetooth module or the BLE communication module, wherein when the second wireless earphone is located outside the cradle and worn on the user's ear, the second location finding alarm command causes the second wireless earphone to output the location finding alarm at the second volume, and wherein when the second wireless earphone is located outside the cradle and not worn on the user's ear, the second wireless earphone outputs the location finding alarm at the first volume greater than or equal to the first threshold.

19. A non-transitory computer-readable medium storing instructions, the instructions comprising: one or more instructions that, when executed by one or more processors of a device cause the one or more processors to:

check a communication connection with a cradle and a plurality of wireless earphones, the plurality of wireless earphones comprising a first wireless earphone and a second wireless earphone; and control the cradle and the plurality of wireless earphones so that:

when the first wireless earphone and the second wireless earphone located inside the cradle, the cradle is controlled to transmit a first location finding alarm command to the first wireless earphone and the second wireless earphone causing the first wireless earphone and the second wireless earphone to output a location finding alarm at a first volume greater than or equal to a first threshold, and when at least one of the first wireless earphone or the second wireless earphone is located outside the cradle, the cradle is controlled to determine whether at least one of the first wireless earphone or the second wireless earphone is worn on a user's ear, based on determining that the at least one of the first wireless earphone or the second wireless earphone is worn on the user's ear, the cradle is controlled to transmit a second location finding alarm command to at least one of the first wireless earphone or the second wireless earphone, causing the at least one of the first wireless earphone or the second wireless earphone to output the location finding alarm at a second volume lower than the first volume, based on determining that the at least one of the first wireless earphone or the second wireless earphone is located outside the cradle and determining that neither the first wireless earphone nor the second wireless earphone is worn on the user's ear, the cradle is controlled to transmit a third location finding alarm command to the first wireless earphone and the second wireless earphone, causing the location finding alarm to be output at the first volume, and based on determining that one of the first wireless earphone and the second wireless earphone is located inside the cradle and other one of the first wireless earphone and the second wireless earphone is located outside the cradle and not worn on the user's ear, the cradle is controlled to transmit a fourth location finding alarm command to the other one of the first wireless earphone and the second wireless earphone located outside the cradle to cause the other one of the first wireless earphone and the second wireless earphone located outside the cradle to output the location finding alarm at the first volume, wake up the one of the first wireless earphone and the second wireless earphone located inside the cradle for outputting the location finding alarm at the first volume through the one located inside cradle, wherein the device comprises a wireless communication module, and wherein the wireless communication module is configured to communicate with an external terminal and the cradle and the plurality of wireless earphones.

* * * * *